United States Patent [19]
Walker

[11] Patent Number: 5,754,036
[45] Date of Patent: May 19, 1998

[54] ENERGY SAVING POWER CONTROL SYSTEM AND METHOD

[75] Inventor: N. Edward Walker, Tampa, Fla.

[73] Assignee: LTI International, Inc., Naples, Fla.

[21] Appl. No.: 687,749

[22] Filed: Jul. 25, 1996

[51] Int. Cl.$^6$ .................................................... G05F 1/44
[52] U.S. Cl. ..................... 323/237; 323/235; 323/300; 323/319; 323/320
[58] Field of Search ..................... 323/299, 300, 323/301, 319, 320, 322, 325, 326, 349, 351, 352, 209, 211, 239, 241, 234, 235, 237, 238

[56] References Cited

U.S. PATENT DOCUMENTS

| | | |
|---|---|---|
| 3,201,597 | 8/1965 | Balan . |
| 3,265,907 | 8/1966 | Kurata . |
| 3,265,930 | 8/1966 | Powell . |
| 3,421,027 | 1/1969 | Maynard . |
| 3,422,309 | 1/1969 | Spira . |
| 3,422,310 | 1/1969 | Widmayer . |
| 3,509,450 | 4/1970 | McNulty . |
| 3,525,882 | 8/1970 | Montague . |
| 3,538,427 | 11/1970 | Oltendorf ................... 323/24 |
| 3,638,102 | 1/1972 | Pelka ........................... 323/9 |
| 3,659,147 | 4/1972 | Widmayer ................ 315/107 |
| 3,679,932 | 7/1972 | Murphy .................... 315/106 |
| 3,691,452 | 9/1972 | Aguiar ........................ 323/19 |
| 3,793,557 | 2/1974 | Cramer ..................... 315/197 |
| 3,821,634 | 6/1974 | Sabolic ....................... 323/24 |
| 3,872,374 | 3/1975 | Rasmussen .............. 323/22 SC |
| 3,919,592 | 11/1975 | Gray ...................... 323/DIG. 1 |
| 3,935,530 | 1/1976 | Tanaka et al. ............... 323/19 |
| 4,042,856 | 8/1977 | Steigerwald .............. 315/246 |
| 4,052,648 | 10/1977 | Nola ........................... 318/200 |
| 4,099,099 | 7/1978 | Grudelbach ............... 315/194 |
| 4,189,664 | 2/1980 | Hirschfeld ................. 315/297 |
| 4,234,820 | 11/1980 | Widmayer ................. 315/152 |
| 4,255,782 | 3/1981 | Joyce .......................... 363/8 |

(List continued on next page.)

FOREIGN PATENT DOCUMENTS

| | | |
|---|---|---|
| 0 200 827 A1 | 11/1986 | European Pat. Off. . |
| 9 263 966 A1 | 4/1988 | European Pat. Off. . |
| 2 526 244 | 11/1983 | France . |
| 29 18 015 | 11/1980 | Germany . |
| 1460006 | 12/1976 | United Kingdom . |
| WO 88/03353 | 5/1988 | WIPO . |

OTHER PUBLICATIONS

Reverse Phase–Controlled Dimmer for Incandescent Lighting, Burkhart and Ostrodka, *IEEE Transactions on Industry Applications*, vol. IA–15, No. 5, Sep./Oct. 1979, pp. 579–588.

Lamp Acoustical Noise and the Reverse Phase Controlled Dimmer, Burkhart and Burtness, *IEEE Transactions on Industry Applications*, vol. IA–8, No. 1, Jan./Feb. 1972, pp. 84–87.

Power FET Controlled Dimmer for Incandescent Lamps, Christiansen and Benedetti, *IEEE Transactions on Industry Applications*, vol. IA–9, No. 3, May/Jun. 1983, pp. 323–327.

*Primary Examiner*—Peter S. Wong
*Assistant Examiner*—Y. J. Han
*Attorney, Agent, or Firm*—Brinks Hofer Gilson & Lione

[57] ABSTRACT

Apparatus and methods for AC power regulation for a wide range of complex capacitive and inductive loads which provide substantial reduction in power consumption while also providing a leading power factor. The system is self-adjusting for a wide range of loads and can reduce power consumption by 25 percent in lighting loads while producing minimal reduction in light output. The system utilizes a main switch consisting of back-to-back MOS Controlled Thyristor devices (MCTs) and a parallel capacitor bank in series with the load. The main switch is initially turned off slightly in advance of the load current zero crossing, and this in combination with the capacitor bank allows power to be reduced in a low noise fashion. The turn-off time is advanced gradually to regulate power at a target reduced level. At the target power level, load phase angle is measured and maintained to control the power savings ratio.

16 Claims, 13 Drawing Sheets

U.S. PATENT DOCUMENTS

| | | | |
|---|---|---|---|
| 4,289,948 | 9/1981 | Jurek et al. | 323/300 |
| 4,300,075 | 11/1981 | Foose et al. | 315/307 |
| 4,302,717 | 11/1981 | Olla | 323/282 |
| 4,350,935 | 9/1982 | Spira | 315/291 |
| 4,352,045 | 9/1982 | Widmayer | 315/291 |
| 4,358,716 | 11/1982 | Cordes | 315/306 |
| 4,359,670 | 11/1982 | Hosaka et al. | 315/307 |
| 4,369,403 | 1/1983 | Lee | 318/729 |
| 4,370,601 | 1/1983 | Horn et al. | 315/307 |
| 4,371,812 | 2/1983 | Widmayer | 315/291 |
| 4,417,156 | 11/1983 | Fukui | 307/252 C |
| 4,434,358 | 2/1984 | Apfelbeck et al. | 323/209 X |
| 4,443,712 | 4/1984 | Gokita | 323/325 X |
| 4,447,765 | 5/1984 | Cote | 323/209 X |
| 4,489,264 | 12/1984 | Dabney | 318/729 |
| 4,507,569 | 3/1985 | Hess, II | 323/321 X |
| 4,542,451 | 9/1985 | Hucker | 363/132 |
| 4,546,308 | 10/1985 | Widmayer | 323/319 |
| 4,636,619 | 1/1987 | Sugimori | 323/235 X |
| 4,642,525 | 2/1987 | Widmayer | 315/219 |
| 4,704,570 | 11/1987 | Hopkins | 318/729 |
| 4,719,402 | 1/1988 | Brennan et al. | 323/211 |
| 4,766,352 | 8/1988 | Widmayer | 315/244 |
| 4,804,916 | 2/1989 | Frank | 323/300 |
| 4,806,838 | 2/1989 | Weber | 318/729 |
| 4,870,340 | 9/1989 | Kral | 323/235 |
| 4,912,390 | 3/1990 | Curran, Jr. et al. | 318/812 |
| 4,933,798 | 6/1990 | Widmayer | 323/239 X |
| 4,956,583 | 9/1990 | Lawrence et al. | 315/220 |
| 5,030,890 | 7/1991 | Johnson | 323/325 X |
| 5,038,081 | 8/1991 | Maile, Jr. et al. | 323/326 X |
| 5,066,896 | 11/1991 | Bertenshaw et al. | 315/291 |
| 5,237,244 | 8/1993 | Bertenshaw et al. | 315/291 |
| 5,519,311 | 5/1996 | Widmayer | 323/319 |
| 5,583,423 | 12/1996 | Bangerter | 323/239 |

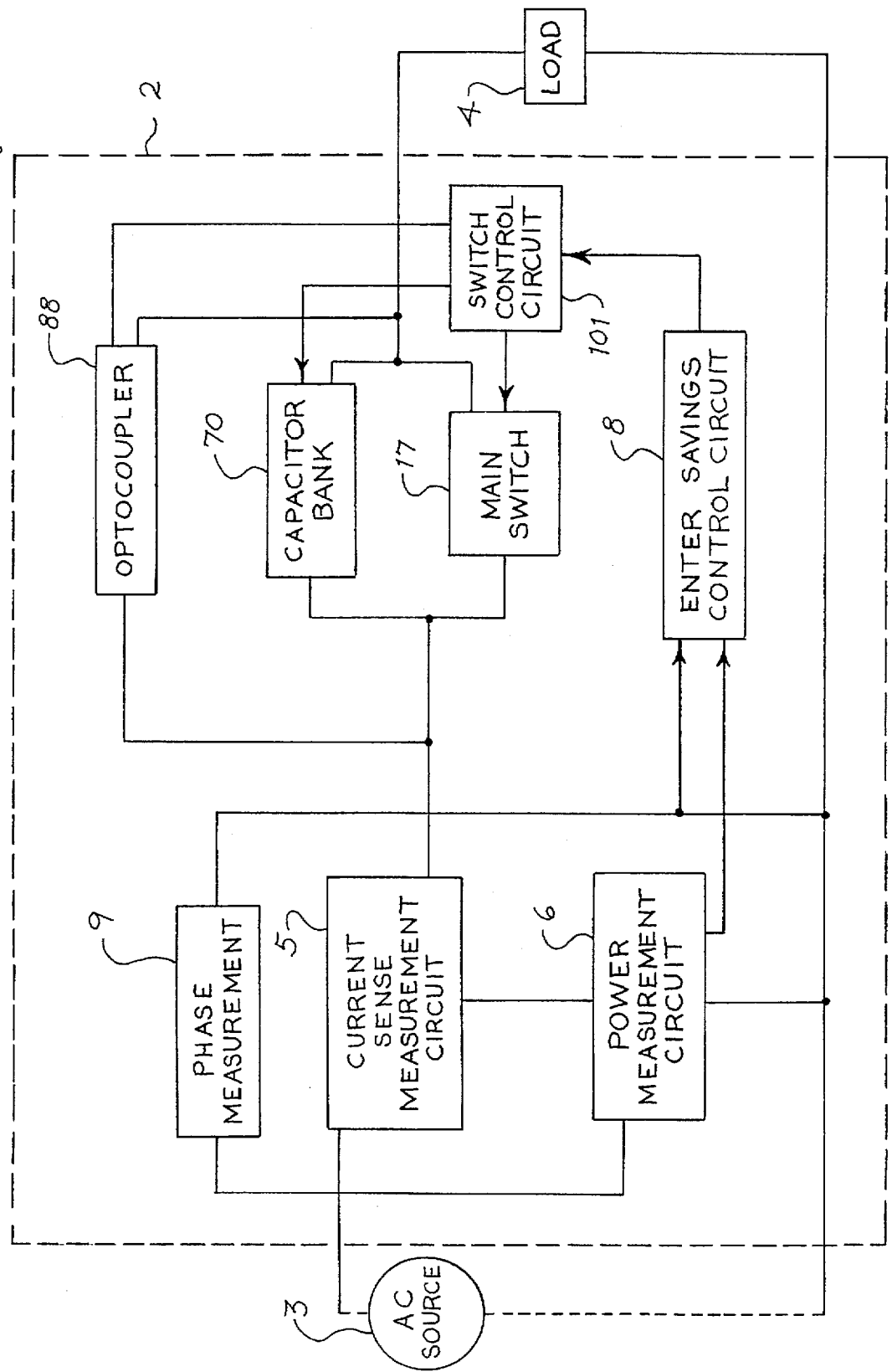

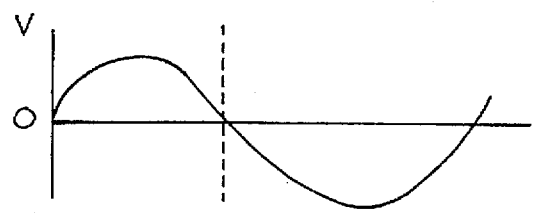
Fig. 5A  WARM-UP MODE LINE VOLTS RMS
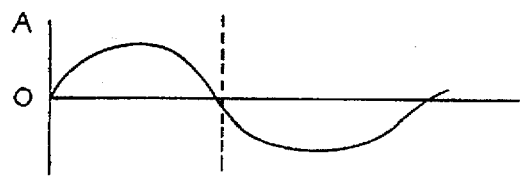
Fig. 5B  WARM-UP MODE LINE & LOAD AMPS RMS
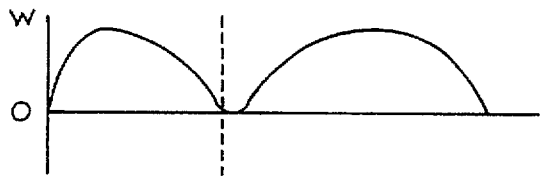
Fig. 5C  WARM-UP MODE INSTANTANEOUS INPUT POWER WATTS
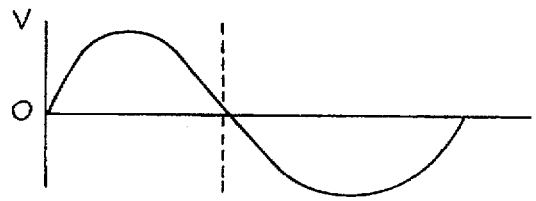
Fig. 6A  SAVINGS MODE LINE VOLTS RMS
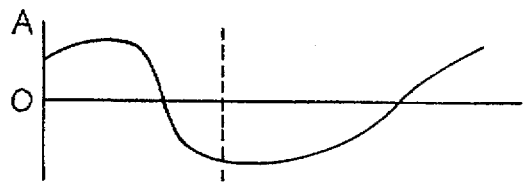
Fig. 6B  SAVINGS MODE LINE & LOAD AMPS RMS
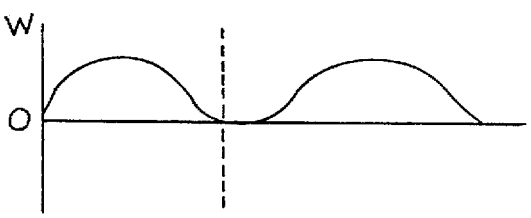
Fig. 6C  SAVINGS MODE INSTANTANEOUS INPUT POWER (WATTS)

ENERGY SAVING POWER CONTROL SYSTEM AND METHOD

TECHNICAL FIELD

This invention relates generally to the field of electronic power regulation and control; and, more specifically, to a power regulation apparatus and method utilizing load phase angle control for reducing energy consumption of a wide range of complex inductive and capacitive loads.

BACKGROUND ART

A variety of AC power regulating circuits are known in the art in which AC power to a load (e.g., fluorescent lamps, motors, etc.) is regulated through control of an AC electronic switch (e.g., a thyristor) interconnecting the source of the AC power and the load. Once activated, the electronic switch typically turns off automatically thereby blocking current to the load when the load current reverses direction (i.e., at the zero crossing) as illustrated in FIG. 1. For example, some prior art systems utilize a triac as an electronic switch because of its bi-directional conduction and high power characteristics. However, a triac only turns off when the current through the triac drops to zero. Thus, to decrease or increase the power to the load, the trigger phase angle is advanced or retarded and the portion of each half wave of AC input power which is applied to the load through the switch is thereby decreased or increased.

Power regulation of this type results in conduction occurring primarily during the later part of each half cycle of the AC power. This tends to cause an inductive (lagging) power factor, generates harmonic distortion and noise spikes reflected into the power line and causes a high crest factor. Such lagging power factors decrease power line efficiency (i.e., increase power line current for a given load power consumption) and frequently results in increased electric utility rates to the user. In addition, because current does not flow from the AC source during the time the electric switch is turned off, substantial harmonic distortion and noise is reflected into the power line which can interfere with the operation of sensitive electronic equipment.

In another type of prior art power regulation circuit, an electronic switch is turned on and off several times during each half cycle to control the current to the load, as illustrated in FIG. 2. Inductive energy is dissipated by switching a short circuit across the load when the electronic switch is turned off. This type of circuit also can produce or aggravate an inductive power factor, and generates harmonic distortion, noise, and a high crest factor on the AC power line. Thus, EMI and RFI filtering is required.

In the two types of prior art regulating circuit discussed thus far, current from the AC power line to the load is interrupted during a substantial portion of each AC half cycle which can result in large surge currents. This large surge current can cause ballast temperatures to rise excessively causing early failure or actual breakdown with acrid smoke generation. In addition, when used to power lighting loads, such as fluorescent lights, at a reduced power level to conserve power, these circuits cause a large reduction in light output.

In a pending application Ser. No. 08/156,200 filed Nov. 22, 1993 by a different inventor (Bangerter) but assigned to the present assignee, problems relating to harmonic distortion, low line noise and high crest factor on an AC line are addressed in part by employing a large parallel energy transfer capacitor substantially greater than 1 µf. In the Bangerter application, it is presented that the large capacitance acts to absorb some of the reactive voltage spikes caused by collapsing magnetic fields upon switch turn-off, provides additional power factor lead, reduces harmonic distortion, reduces crest factor, and reduces noise spikes reflected into the power line. The Bangerter application also presents a method of feedback whereby voltage and current to the load are continuously monitored to measure power to the load and to maintain a desired power savings ratio—reduced target power versus full power. Efficient maintenance of a desired power savings ratio, however, can sometimes be an elusive goal where dynamic loads are present. This is due to the difficulty in approximating load changes by monitoring voltage and current while operating at a reduced power level.

Accordingly, there is a need for an improved feedback system which more accurately approximates system load changes for the purpose of more efficiently maintaining a desired power savings ratio. There is also a need in the art for more reliable and robust system performance in the face of complex inductive and capacitive loads.

SUMMARY OF THE INVENTION

The present invention is directed to an AC power regulation system for controlling power to a load. The input of the present invention is coupled to an AC power source, while the output is coupled to the load. The present invention has a controllable switch in series with the input and the output and a capacitor bank in parallel with the controllable switch. The present invention also has circuitry for turning-on and turning off the controllable switch and circuitry for setting and storing a target power value. The circuitry for turning on and turning off the controllable switch operates to reduce the power to the load to achieve a reduced target power value.

Once the reduced target power level is achieved, the present invention has circuitry for measuring and storing a value representative of a phase angle of the load. Other circuitry is used to monitor subsequent values representative of load phase angles and to compare them with the stored value to maintain a desired power savings with respect to the load. Utilizing this phase angle control system, the present invention achieves efficient AC power regulation and self-adjustment for a wide range of loads.

The method and apparatus of the present invention also achieves more reliable and robust performance than prior art energy regulating systems. This is accomplished by initially turning the controllable switch off slightly in advance of the load current zero-crossing (see FIG. 3A) which creates a quasi-sinusoidal voltage pulse across the main switch/capacitor (see FIG. 3B). This switching technique results in a more reliable start-up operation by reducing the possibility of oscillating inductive loads, flicker, in the case of lighting loads, and large voltage swings and transients. After the current waveform swings through zero and reverses its polarity, the switch is turned back on only when the voltage across the switch is at or close to the zero-voltage point. This action repeats for every half-cycle of the line frequency, except that the turn-off point of the switch is gradually advanced further ahead of the load current zero-crossing to reduce power. Accordingly, current will flow during substantially all of the AC cycle, and a substantial amount of power to the load is provided by current flowing through the capacitor when the switch is off.

BRIEF DESCRIPTION OF THE DRAWINGS

FIG. 4 is a generalized block diagram of the power regulation circuit of the present invention.

FIG. 5A is a line voltage waveform for the preferred power regulation circuit in the Warm-Up mode.

FIG. 5B is a line and load current waveform for the preferred power regulation circuit in the Warm-Up mode.

FIG. 5C is a load power waveform for the preferred power regulation circuit in the Warm-Up mode.

FIG. 6A is a line voltage waveform for the preferred power regulation circuit in the savings mode.

FIG. 6B is a line and load current waveform for the preferred power regulation circuit in the savings mode.

FIG. 6C is a load power waveform for the preferred power regulation circuit in the savings mode.

DETAILED DESCRIPTION OF THE PREFERRED EMBODIMENTS

Figure 1:
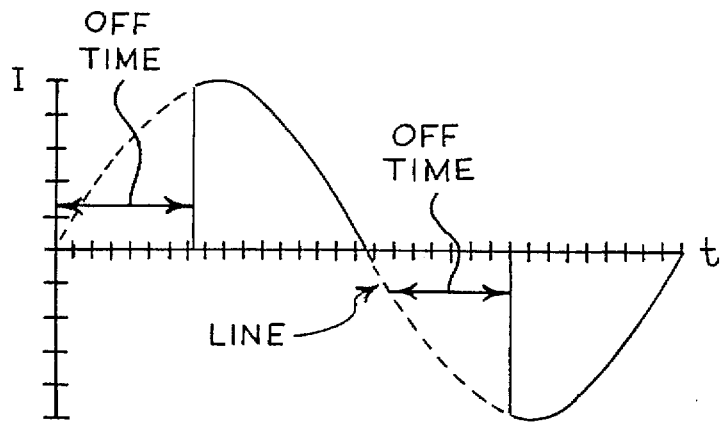
FIG. 1 is a current waveform through the load control device for a prior art regulation device.
Figure 2:
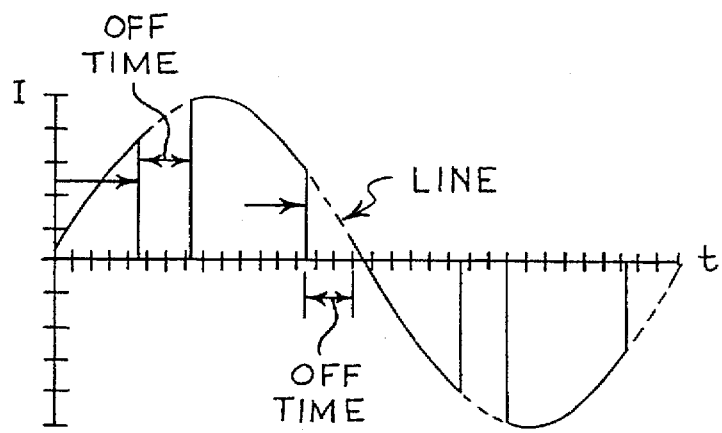
FIG. 2 is a current waveform through the load control device for a second prior art regulation device.

Referring to FIG. 4, there is shown a generalized block diagram of one embodiment of a power regulation system 2 for regulating AC electrical power to a load 4. Although the system 2 is primarily designed to operate with inductive loads such as fluorescent lights, the system 2 will work with a wide variety of complex inductive and capacitive loads. The system 2 controls power to the load 4 from an AC source 3 by means of its main switch 17 which is connected in series with the load 4. The combination of power switch off/on timing in conjunction with proper capacitor selection provides control of power to the load as well as other power conditioning benefits. Following the application of AC power, the system 2 operates in one of 4 normal operating modes: Warm-Up, Enter Savings, Savings, and Exit Savings.

During Warm-Up when power from AC source 3 is first applied to the system 2, the main switch 17 is continuously on and power to the load 4 is essentially the same as if the system 2 were not present. This initial Warm-Up mode is approximately twelve minutes and allows the load 4 characteristics to stabilize. At the end of the Warm-Up mode one or more internal capacitors 58, 60, 62, 64, 66 and 68 within the selectable capacitor bank 70 are connected across the main switch 17 by the switch control circuit 101. The internal capacitors which have a typical combined value for a 20 amp load of more than 100 µf, are internally arranged in groupings based upon the following expression:

C (total) is proportional to (D×Iac)/(f−Vac) where
C=internal capacitor combined value, farads
D=power switch off/on duty ratio
Iac=AC load current amps
Vac=AC line voltage, volts
f=line frequency, Hz From this expression, the system 2 selects the appropriate capacitance for the desired range of operating currents and voltages. In one embodiment, the line voltage and frequency are fixed. Accordingly, during Warm-Up the current sense measurement circuit 5 is used to measure the remaining load current variable to select a capacitance.

Proper capacitance selection is important for optimal system 2 performance. If the selected capacitance is too high, the system 2 will not achieve the desired power savings. If the selected capacitance is too low, high harmonic distortion may result. The optimal capacitance value is the largest value that will not require D>1 for any combination of operating current, voltage or frequency.

The parallel capacitance supplied by the capacitor bank 70 must be sufficiently large such that current conduction through the capacitor bank 70 to the load 4 will not result in a ringing effect (phase reversal). In the preferred embodiment, the internal combined capacitance should have a range which includes 100 µf for a load 4 in the range of 20 amps. The capacitance range including 100 µf will be also be sufficient to absorb reactive voltage spikes caused by collapsing magnetic fields of inductive loads when the main switch 17 is turned off.

Also, the timing of the capacitor bank 70 switching is important. To prevent transients which may cause objectionable flicker or instability it is necessary to switch the capacitor bank 70 in/out of the system 2 only during the intervals when the switch 17 is on. The system 2 contains means to ensure that capacitor bank 70 connections/disconnections are made during such safe intervals.

During Warm-Up, the load power is also monitored by power measurement circuit 6 and stored for later use during the Enter Savings mode. Representative line voltage, line current and instantaneous input power waveforms during the Warm-Up period are shown in FIGS. 5(A)–(C), respectively.

Figure 3A:
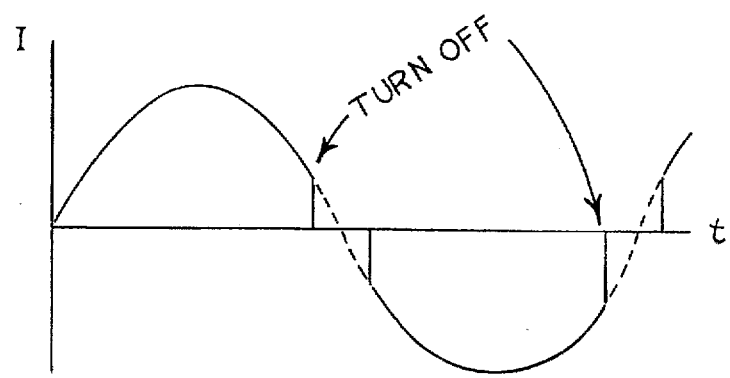
FIG. 3A is a current waveform through the load control switch when the switch is initially turned off prior to the load current zero-crossing in accord with the preferred power regulation circuit.
Figure 3B:
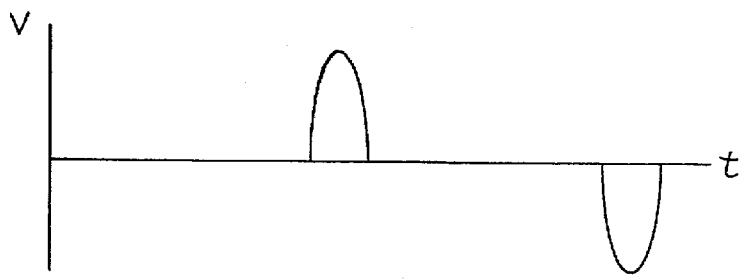
FIG. 3B is the resulting voltage waveform across the switch and parallel capacitance when the switch is initially turned off prior to the load current zero-crossing in accordance with the preferred power regulation circuit.

Upon transition to the Enter Savings mode, the enter savings control circuit 8 provides for a gradual reduction of power, effected by the switch control circuit 101. Load power will be reduced until a target power level is reached. In the preferred embodiment, this target power level is typically 75% of the load power measured during Warm-Up after stabilization of the load. During Enter Savings system 2 starts to adjust the voltage/current to the load by precise adjustment of the timing of the main switch 17. The switch 17 is initially turned off slightly in advance of the load current zero-crossing (see FIG. 3A), which creates a quasi-sinusoidal voltage pulse (see FIG. 3B) across the switch 17/capacitor 70 combination. This quasi-sinusoidal voltage pulse peaks at the current zero crossing.

The first time at which the main switch 17 is turned off after starting the Enter Savings mode can be important. Successful entry into Enter Savings mode requires that the initial turn-off point be close to and before the current zero-crossing. It has been determined that initially switching off 1.8 milliseconds (ms) in advance of the line voltage zero-crossing results in the switch turning off close to, but in advance of, the line-current zero-crossing. If turn-off occurs too far ahead of the current zero-crossing, noticeable lighting flicker, oscillating inductive loads, and/or large destructive voltage swings may occur. Alternatively, if the initial turn-off occurs at any point to the right of the current zero-crossing, this may introduce large transients which may cause oscillations (continual flickering) and system shutdown due to excessive current.

As the load current waveform attempts to swing through zero and reverse its polarity, the switch 17 is commanded to turn back on. The switch 17, however, will not turn on unless the voltage, monitored by optocoupler 88 across the switch 17 and capacitor bank 70 is very close to zero, otherwise a very high current capacitive discharge may occur which could damage the main switch 17 or other system 2 components. This switch 17 on/off operation repeats for every half-cycle of the line frequency, except that the turn-off point of the switch 17 is gradually advanced further ahead of the current zero-crossing point during Enter Savings mode.

The switch 17 turn-off point is advanced slowly over an approximate 1 minute period, creating ever larger voltage pulses across the switch 17/capacitor 70. Since the switch 17/capacitor 70 is in series with the load 4, this reduces the effective load voltage until the desired power savings point is reached. The gradual reduction of power will make any slight amount of lamp dimming imperceptible to most users, even at significant power savings points (e.g. 25%) for many lamp/ballast types. Also, gradual power reduction is desirable to help avoid transients which could cause lamp flickering or cause large damaging voltage swings in inductive loads. Purposeful dimming can be achieved if desired by increasing the power savings.

During the power reduction process, desirable effects of phase lead due to the reactance of the parallel capacitance are gradually introduced. In addition, the resultant quasi-sinusoidal load voltage/current waveforms achieve quiet operation. (For example, the system can meet present FCC EMI requirements without the need for special filtering.) Also, the present switch 17/capacitor 70 operation in conjunction with several ballast load types has been determined to reduce the total harmonic distortions of their current waveforms.

The power savings point is determined by measuring the reduced power and comparing it to the target power value measured during Warm-Up mode. When the target power is reached (e.g., load power=75% of Warm-Up power), operation switches to Savings Mode.

After ramping down to the target power savings point during Enter Savings, a feedback control system is activated which regulates the switch 17 timing to maintain the target power savings point. However, the regulation point is not power, but is phase angle which provides tolerance to load switching and lamp outages. At the end of the Enter Savings mode, when the target power is achieved, a voltage which represents the load phase angle is stored. Referring to FIG. 4, phase measurement circuit 9, generates and stores a DC reference voltage representative of the phase difference between the AC line current and AC line voltage. During Savings mode, phase measurement circuit 9 continues to generate a voltage signal representative of the phase difference between the line current and voltage. If the two voltages are not equal, then the switch control circuit 101 will adjust the duty cycle of the switch 17 to reduce the difference to maintain the reference load phase angle. It has been found that the input phase angle is a good representation of the desired power savings ratio (ratio of target power to initial power) even in the presence of subsequent changes in the load power caused by outages or downline switching. The representative line voltage, line current and instantaneous input power waveforms during Savings are shown in FIGS. 6(A)–(C), respectively.

At times it is necessary to exit the savings mode as explained below. This process is also performed in a controlled fashion to prevent noticeable lamp flicker and destructive transients. This mode, where operation is reversed from Savings Mode to the Warm-Up mode is referred to as the Exit Savings or system reset mode, and occurs for any of the following conditions:

1. Operating current range change:
    A significant load change has occurred which requires changing the value of the parallel capacitance.
2. Long-term timer timeout:
    An internal long-term timer creates a daily system reset. This feature is used in cold climates to apply a daily full-power warmup period to lamp systems, some of which if aged may extinguish in very cold weather conditions when in the savings mode.
3. Undercurrent:
    The operating current has dropped below the minimum operating current accommodated by the available parallel capacitance values.
4. Line voltage too low:
    A return to full power is required for low line voltage conditions to ensure that some ballast types maintain sufficient output voltage to keep their lamps ignited.

After Exit Savings mode is triggered, the phase angle feedback control is disconnected, and the Enter Savings timing control sequence reverses, with power switch 17 turn-off slowly adjusted to occur later in the cycle until turn-off occurs slightly preceding the current zero-crossing. At that point, the switch 17 is turned on continuously and the Warm-Up timer is reset. The timer is released for conditions (1) and (2). The timer is not released for conditions (3) and (4) until the operating current/voltage are within specification. Following timer release the normal Warm-Up mode commences.

Exceptions to the above slow-adjustment process are fault conditions, which quickly turn on the power switch and restore full power to the load 4:

1. Overcurrent;
2. Overvoltage or instability due to highly inductive loads;
3. Internal power switch fault.

AC POWER HANDLING CIRCUITRY

AC Power Interconnection Circuitry

Figure 7A:
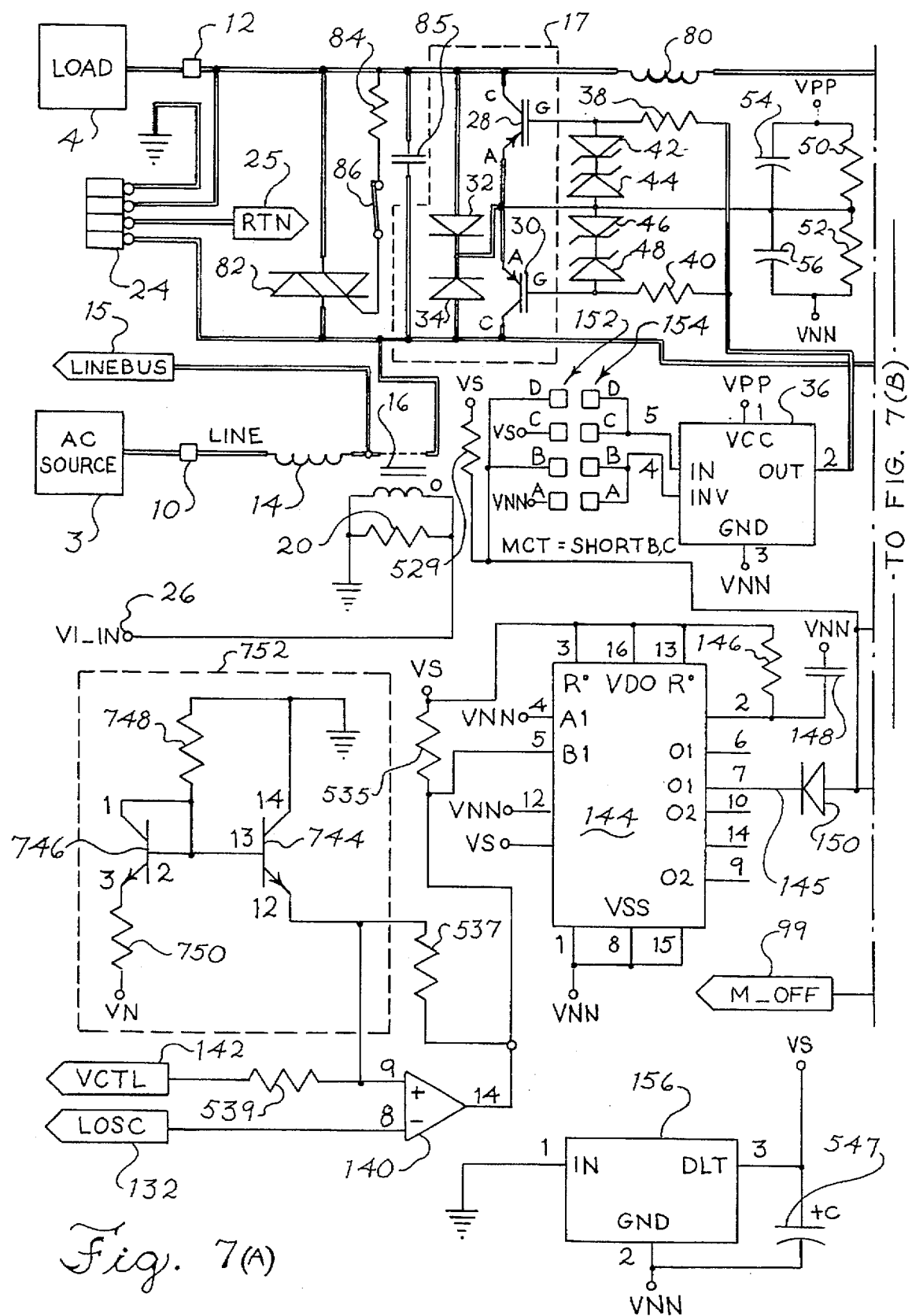
FIG. 7 is a schematic showing, in full or in part, embodiments of the following: a switch control circuit, a main switch, a capacitor bank, a pulse width generator circuit, a line-load voltage sense circuit, an over-voltage detector circuit, a half-wave fault detector circuit, and a manual off circuit, all in accord with the preferred power regulation circuit.
Figure 7B:
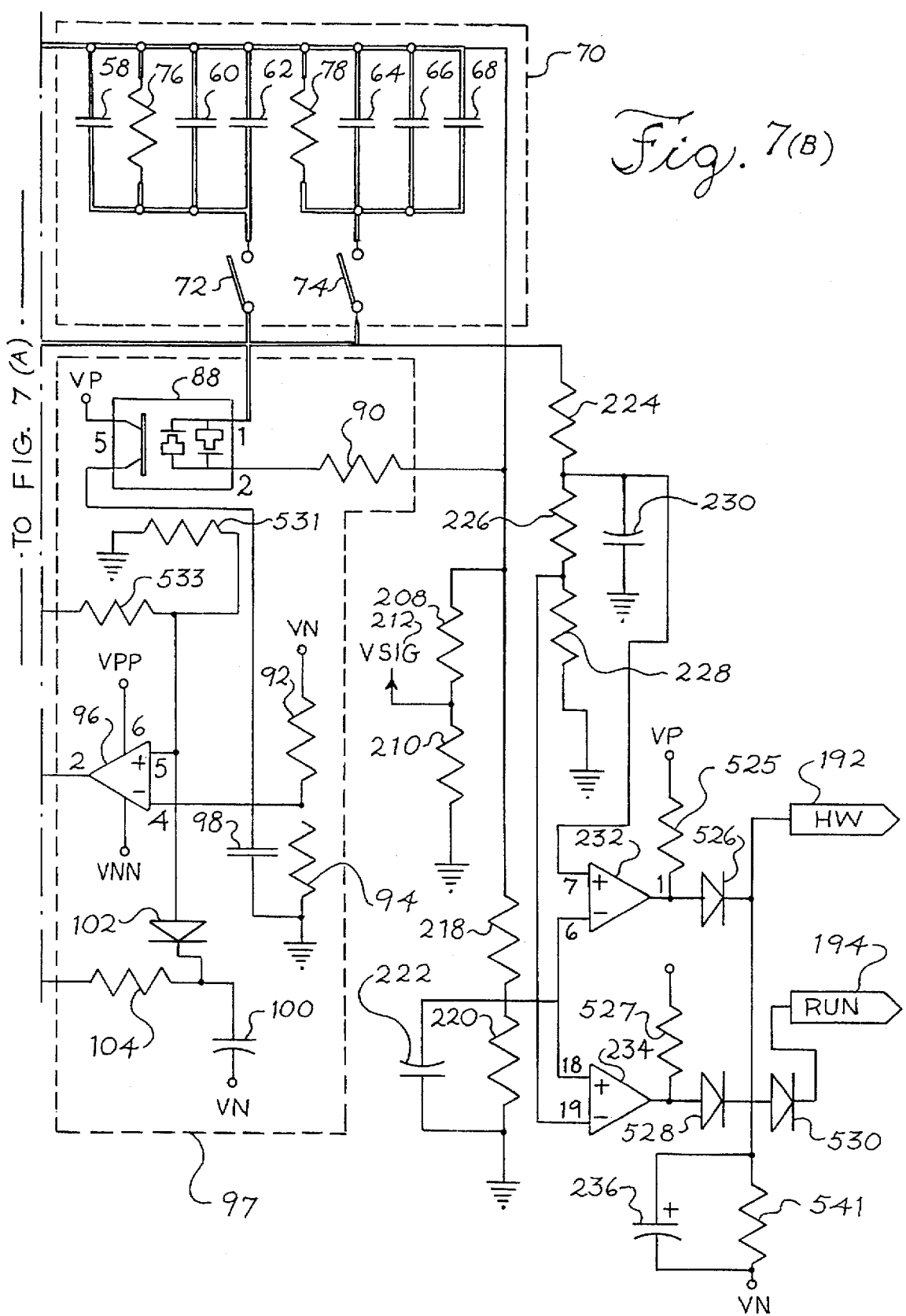

Referring now to FIG. 7, the system 2 of FIG. 4 is connected between the AC source 3 voltage and the load 4. AC hot is connected to connector 10, while the load 4 is connected to connector 12. The AC hot voltage is high-frequency filtered by inductor 14. The filtered voltage linebus 15 feeds the line side of the main switch 17. Linebus 15 is routed through current transformer 16 and to the primary of low-voltage transformer 18 (see FIG. 8). Low voltage transformer 18 is used to generate the circuit's internal power supply voltages. A jumper strap is used to connect linebus 15 to the desired voltage tap on low voltage transformer 18. Current transformer 16 and scaling resistor 20 are used to generate a voltage representation $VI_{13}$ IN 26 of the AC line current flowing through the control system of the present invention to the load. The AC neutral for low voltage transformer 18 (see FIG. 8) is connected to RTN 25 (see FIG. 8). The surge protector 24 has metal-oxide varistors (MOVs) which clamp the line/load voltages to safe levels in the event of AC line voltage or internally-generated surges/transients.

Main Switch Circuitry

The present invention's main switch 17 is a series AC power switch placed between the source 3 and load 4. Two MOS Controlled Thyristor (MCT) devices, MCT 28 and MCT 30, are used in the preferred embodiment for the AC power switching. Of course, other switching devices, well known in the art, may be substituted without changing the scope of the present invention. Since the MCT is a unidirectional device two devices must be used for AC bidirectional switching. Two related power diodes, diode 32 and diode 34, are used to safely shunt current around an MCT when it is reverse-biased. Both MCTs are turned on or off simultaneously by a gate drive voltage applied to their commongate circuit by IC driver 36. Resistor 38 and resistor 40 are used to limit gate drive currents, limit MCT switching speeds, and prevent local high-frequency oscillations. Two pairs of back-to-back zener diodes, zener diode 42 and zener diode 44 being one pair and zener diode 46 and zener diode 48 being the other pair, are used to protect the MCT gate functions from breakdown caused by transient voltage spikes. The common MCT anodes are connected to a resistor divider consisting of resistor 50 and resistor 52 which sets the anode voltage for the gate driver circuit 36. Capacitor 54 and capacitor 56 supply high-frequency switching currents.

Capacitor Bank Circuitry

A capacitor bank 70 is used in parallel with the main power switch 17. The total bank 70 should have a capacitance range which encompasses at least 100 μF when load currents have a range of approximately 20 amps. The bank 70 is split into two selectable sections to allow operation over a wide range of load currents, with total capacitance being proportional to operating current. Of course, more sections, and thus more capacitance can be added without altering the scope of the present invention. Relay contact 72 switches in the lower bank consisting of capacitor 58, capacitor 60 and capacitor 62. Relay contact 74 switches in the upper bank consisting of capacitor 64, capacitor 66 and capacitor 68. Relay contact 72 and relay contact 74 are both open during the initial Warm-Up mode, or following a manual off command.

During Savings, for lower load currents in the range of 10 to 14 amps, relay contact 72 is closed and relay contact 74 is open. When load currents are in the range of 14 to 20 amps both relay contact 72 and relay contact 74 are closed (via relay coils 658 and 660 shown in FIG. 11). Resistor 76 and resistor 78 are used to remove stored charge from the capacitors when they are switched out of the circuit. The main switch 17 does not turn on unless the voltage across the main switch 17 and capacitor bank 70 is very close to zero, otherwise a very high current capacitive discharge could occur which could damage the main switch 17. Since switching cannot be guaranteed to occur exactly at zero volts, inductor 80 is used to safely limit the discharge current for the residue of voltage which may be on the capacitors at the switch point.

Triac Circuitry

Triac 82 is connected from line to load and thus is in parallel with the main power switch 17 and capacitor bank 70 combination. Turn-on drive for the triac 82 is provided via resistor 84 and relay contact 86. Since relay contact 86 is a normally closed contact, the triac 82 will turn itself on in the absence of power to the circuit. This allows the triac 82 to be used as a bypass switch (i.e., provide full power to the load) in the event that the low-voltage supply fails and the main power switch 17 becomes inoperative. Also, if there is a malfunction, the low-voltage supply can be manually turned off by opening the bypass key switch 551 (see FIG. 8), which will turn on the triac 82 and activate the bypass function. The triac's 82 high surge current capability is also used to bypass the main switch 17 at initial turn-on, when the load 4 exhibits high surge currents (>100 amps).

Line-Load Voltage Sense Circuit

When operating the main switch 17, it is important to not allow the switch 17 to turn on when significant line-load voltage is present across the capacitor bank 70. This is accomplished by monitoring the line-load voltage with line-load voltage sense circuit 97. The input of optocoupler 88 can respond to current of either polarity, as determined by the line-load voltage and resistor 90. The output pin 87 of optocoupler 88 generates unipolar (rectified) output current proportional to the line-load voltage. This current is injected into a bias network consisting of resistor 92 and resistor 94 and the negative input of comparator 96. This bias network provides a slight negative bias voltage, with noise filtering provided by capacitor 98. This bias voltage is equivalent to a line-load voltage of ± a few volts. The output of the comparator 96 is used to hold gate driver 36 off (see FIG. 7) (i.e., can't turn main power switch 17 ON) whenever the injected current is above the bias level. Therefore, only when the line-load voltage is below the voltage threshold of a few volts is the main switch 17 allowed to turn on, irrespective of the input from the switch control circuit 101.

Line-load voltage sense circuit 97 is initialized inactive (main switch 17 OFF) during system turn-on by capacitor 100. The voltage sense circuit 97 is also used by the Manual Off (MOFF*) signal 99 from FIG. 11. When MOFF* 99 is high (not active), it is disconnected from the voltage sense circuit 97 by blocking diode 102. When MOFF* 99 is low (active), it is used to pull the positive input of comparator 96 which will hold gate driver 36 off (can't turn main switch 17 ON). Resistor 104 limits the MOFF* 99 signal current.

MAIN POWER SWITCH CONTROL CIRCUIT

Local Oscillator Circuit

Figure 9:
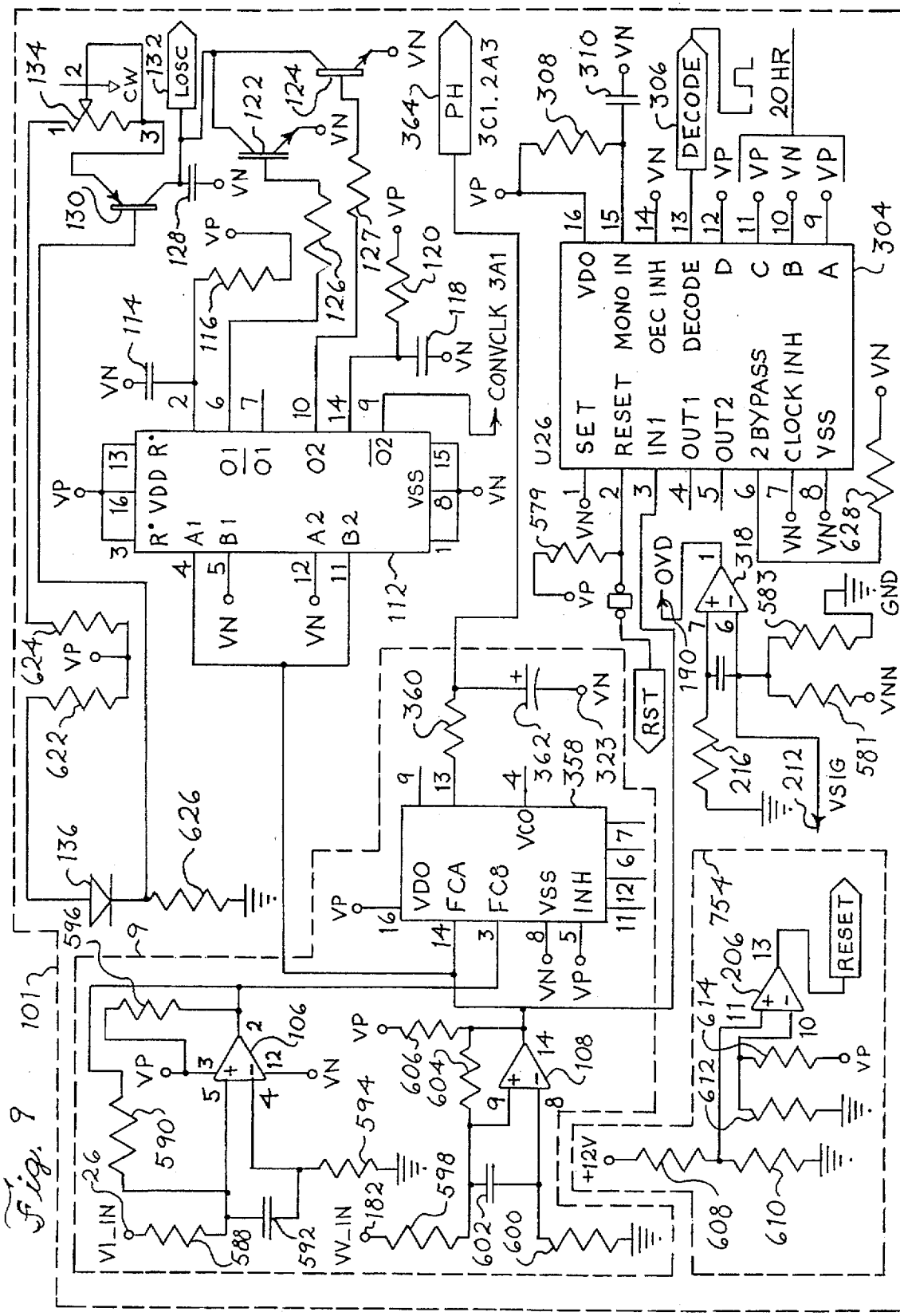
FIG. 9 is a schematic showing, in full or in part, embodiments of the following: a switch control circuit consisting of a ramp and feedback amplifier circuit, a timer circuit, a power phase measurement circuit, an over-voltage detector circuit and a 12 volt low-voltage sense circuit, all in accord with the preferred power regulation circuit.

The main power switch 17 is switched by the control circuit 101 in a known timing relationship to the zero-crossings of the line current waveform. Referring to FIG. 9, the switch control circuit 101 generates a local oscillator signal (LOSC) 132 which is slaved to the zero-crossings of the AC line frequency. The input AC line current and voltage sense signals $VI_{13}$ IN 26 and $VV_{13}$ IN 182 are buffered and squared by comparator 106 and comparator 108, respectively, with the squared outputs crossing zero at essentially the same time that the actual AC line waveforms cross zero. Both comparators 106 and 108 have associated feedback resistors and filtering capacitors, well-known in the art, to prevent inadvertent switching resulting from hysteresis and small noise variations. Although using the line current waveforms would allow a direct measurement, testing has shown that using the line current tends to make the system unstable due to the significant effect system operation has on the line current. Contrastingly, using line voltage results in stable operation because line voltage is not noticeably affected by system operation. Accordingly, in the preferred embodiment, line voltage measurements are used to determine the switch turn-off and turn-on points. Measuring line voltage, the position of the current zero-crossing is thereby determined from the phase angle relationship of the circuit loads. The circuit can operate with loads having phase angles from several degrees positive (leading) to several degrees negative (lagging), where lead/lag refers to the traditional relationship of the current waveform leading or lagging the voltage waveform. Accordingly, by using the voltage zero-crossing, it is known that the current zero-crossing will be within a small defined time range of the actual current zero-crossings. Testing has determined that this range of uncertainty is acceptable for reliable operation with a wide variety of load types.

The squared voltage waveform is fed to both inputs of dual one-shot IC 112. One output of this IC 112 generates a pulse determined by the rising edge of the input waveform, while the other output generates a pulse determined by the falling edge of the input waveform, thereby generating one pulse at each half-cycle of the AC input waveform, occurring within a known tolerance of the zero-crossings of the AC current waveform. The output pulse widths are determined by RC networks consisting of capacitor 114 and resistor 116 and capacitor 118 and resistor 120 and are narrow compared to the line frequency. The output pulses are buffered by transistor 122 and transistor 124 via resistor 126 and resistor 127.

Transistor 122 and transistor 124 are used to rapidly discharge ramp capacitor 128 once each half-cycle. Between discharge intervals, capacitor 128 is charged by constant current network transistor 130 and related components. The charge/discharge actions result in the generation of a sawtooth waveform LOSC 132, having a base approximately at −5V and rising to slightly above zero volts each half-cycle at which time reset occurs. The waveform is adjusted via production calibration potentiometer 134 to peak a few tenths of a volt above ground. This adjustment is used to optimize operation for the range of known phase angles between the line voltage and current waveforms. Diode 136 is used to temperature compensate the junction of transistor 130 to help ensure an accurate LOSC 132 waveform over the circuit's operating temperature range.

Pulse Width Generator Circuitry

Referring again to FIG. 7, the LOSC 132 reference waveform is fed to the plus input of comparator 140. Control signal VCTL 142 is applied to the other input of comparator 140. VCTL 142 is a slow-moving error signal (essentially DC compared to line frequency). When under duty cycle control (Enter Savings, Savings, Exit Savings), VCTL 142 is at a value within the range of −5V to ground. The output of comparator 140 switches low when LOSC 132 ramps higher than VCTL 142 and switches high when LOSC 132 is reset, thereby creating a pulse waveform at the output of comparator 140 whose low-state width linearly increases as VCTL 142 goes more negative; i.e., traditional pulse-width modulation.

When in Warm-Up mode, control signal VCTL 142 is set to zero volts. The point when the rising ramp voltage LOSC 132 just exceeds the VCTL 142 control voltage is the point at which the main switch 17 is forced to turn off. It is imperative that the ramp strikes zero volts prior to the zero-crossing of the AC waveform. Since it is known that, within a given range of phase angle uncertainty, the peak/reset point of LOSC 132 occurs synchronous to the zero-crossing, then the initial turn-off command at Enter Savings must occur prior to the peak/reset of LOSC 132. This is accomplished by setting the peak value for the LOSC 132 waveform above ground by a calibration amount of a few tenths of a volt (accomplished by LOSC circuit values plus adjustment of calibration potentiometer 134 shown in FIG. 9), ensuring that the ramp voltage strikes the zero volts start-point of VCTL 142 ahead of the zero-crossing for the first turn-off switching cycle of the main switch 17.

As Enter Savings mode continues, VCTL 142 is ramped lower to move the turnoff time earlier each half cycle until the desired power reduction point is reached. The output of comparator 140 is connected to one-half of dual one-shot 144. The output 145 of the one-shot 144 goes low when the input waveform goes low, or at the point when the LOSC 132 ramp voltage just exceeds VCTL 142. The output has a pulse width defined by resistor 146 and capacitor 148, which is approximately 1 millisecond. The low-state pulse from dual one-shot 144 forces the main power switch 17 to turn off. Dual one-shot 144 is used to limit the turn-off command pulse from comparator 140 to prevent accidental extension of a turn-off command into a subsequent half-cycle which can cause system instability due to timing uncertainties. Such uncertainties can arise due to the phase angle uncertainty between current and voltage waveforms, which in particular can create problems during Enter Savings mode when main switch 17 turn-off commands are located close to the zero-crossings of the current waveform. Using dual one-shot 144 ensures a smooth entry into Savings mode with no instabilities for a wide variety of load types.

Duty cycle limiter circuit 752 is a clamp circuit which will not allow VCTL 142 at pin 9 of comparator 140 to go lower than a predetermined level. The predetermined level is a bias voltage dictated by resistors 748 and 750. Transistor 744 is a buffer for the bias voltage that clamps VCTL 142. Transistor 746 is used as a temperature compensating diode to compensate for the voltage drop through the base-emitter junction of transistor 744. The circuit 752 prevents VCTL from going too low and entering a 100% duty cycle where the switch 17 is always off. If this were to happen, the system load 4 could become unstable and, in the case of lighting loads, there could be noticeable blinking and oscillations.

The pulsed output from dual one-shot 144 is coupled through OR'ing diode 150 to MCT gate IC driver 36, which with bias network resistor 50 and resistor 52 provides the appropriate nominal +20/−10V (off/on) drive voltage for MCTs 28 and MCT 30. The drive polarity of IC driver 36 is determined by jumper 152 and jumper 154. In the embodiment shown, the inverting input of the IC driver 36 is used whereby connector B of jumper 152 is connected to connector B of jumper 154 and connector C of jumper 152 is connected to connector C of jumper 154.

Shortly after the low-state pulse from dual one-shot 144 forces the main power switch 17 to turn off, current through the capacitor bank 70 creates a line-load voltage sufficient to trigger the bi-directional optocoupler 88. This forces the output of comparator 96 low, which is OR'd with the output of dual one-shot 144 to the input of gate IC driver 36, thereby maintaining the main power switch 17 off until the line-load voltage returns approximately to zero.

Three-terminal regulator 156 is used to create voltage reference V5 which is 5V above −15V. V5 is used to create the signal levels required by gate IC driver 36.

Ramp And Feedback Amplifier Circuitry

Figure 10A:
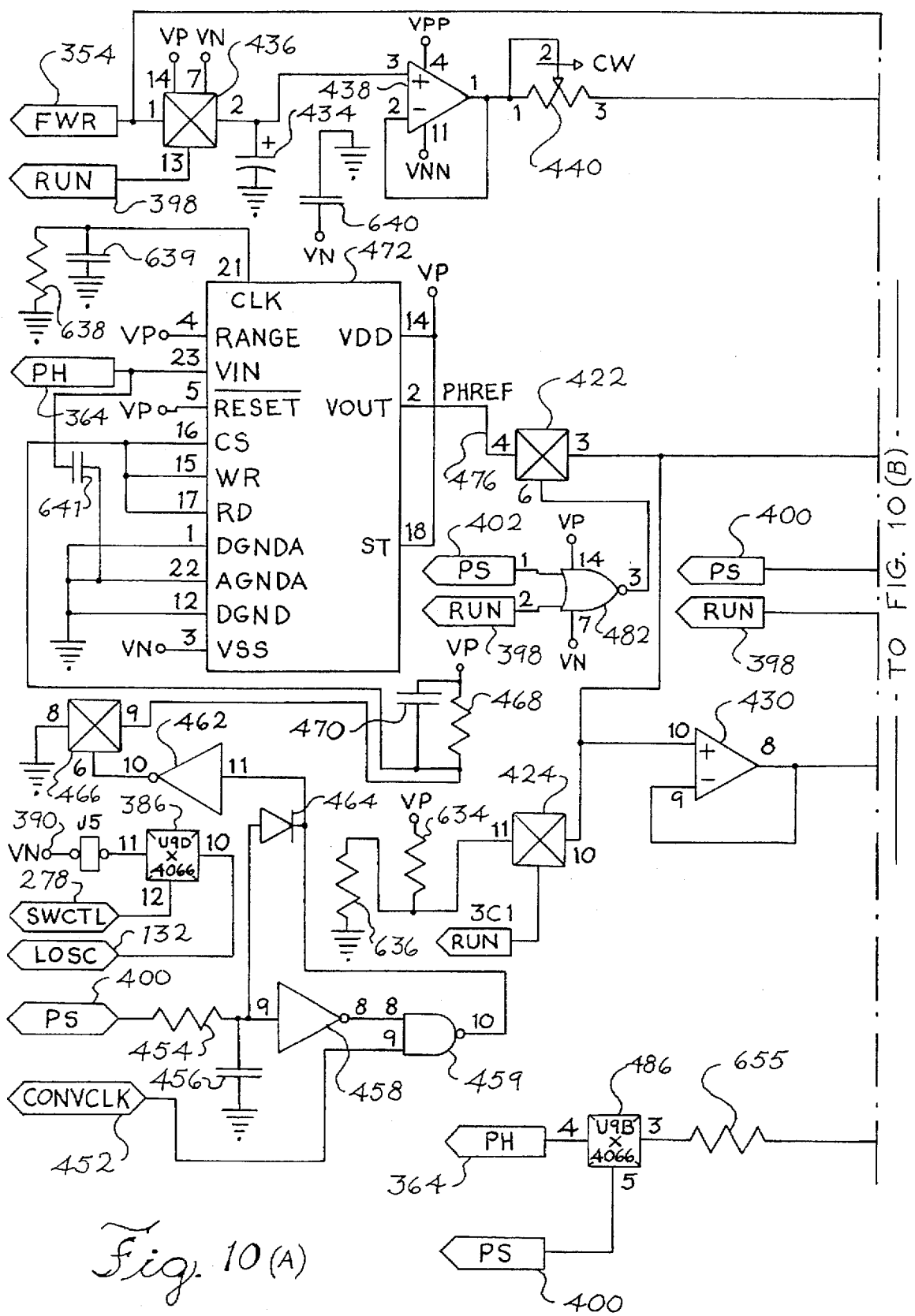
FIG. 10 is a schematic showing, in full or in part, embodiments of the following: a ramp and feedback amplifier circuit and an enter savings control circuit, all in accord with the preferred power regulation circuit.
Figure 10B:
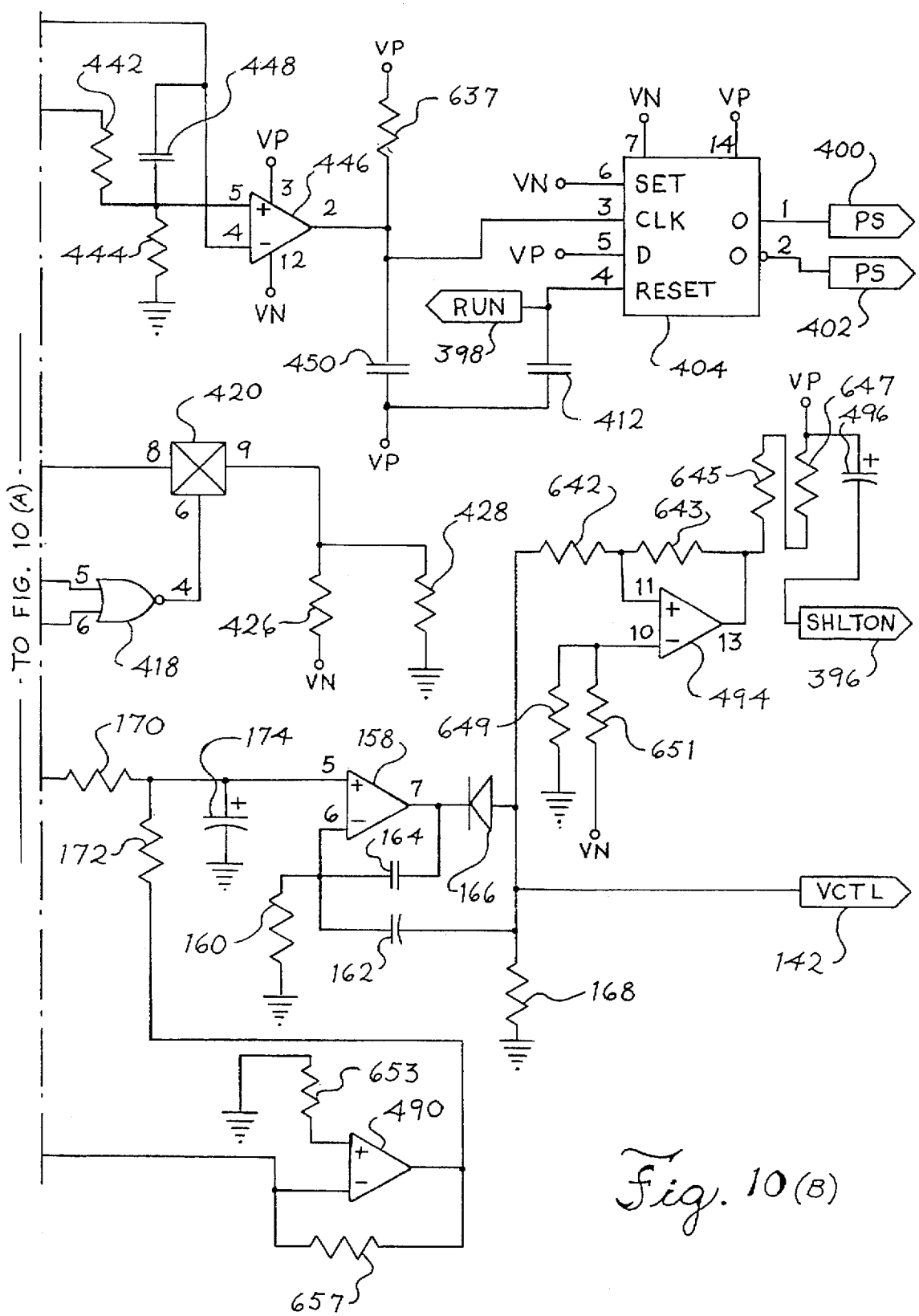

Referring now to FIG. 10, control signal VCTL 142 is generated by operational amplifier 158. The amplifier 158 is configured as an integrator with its time constant set by resistor 160 and capacitor 162. High frequency stability filtering is provided by capacitor 164. The amplifier 158 output is prevented from going more positive than approximately zero volts by blocking diode 166. Since diode 166 is located within the amplifier's feedback loop it creates no appreciable error for VCTL 142 output voltages in the normal range of zero to −5V. Resistor 168 provides a ground reference for the zero-volt output when diode 166 is back-biased.

The control circuitry of the present invention provides input signals to amplifier 158 at resistor 170 and resistor 172, which are filtered by capacitor 174. During Savings mode, amplifier 158 operates as a feedback control amplifier, with the control voltage applied to resistor 170 and the feedback signal applied to resistor 172. The respective control and feedback signals are out-of-phase, therefore the junction of resistor 170 and resistor 172 is a summing junction. If the feedback signal does not equal the control signal, an error signal is developed at the junction on capacitor 174. This error signal is integrated by amplifier 158 whose VCTL 142 output moves in a direction to adjust the main switch 17 (see FIG. 7) duty cycle in a direction to reduce the error.

When not in Savings mode resistor 172 has zero volts applied, and resistor 170 has either a positive or negative fixed voltage applied. A negative voltage of about −0.22 volts is applied for Enter Savings. Prior to Enter Savings, VCTL 142 is set to zero volts. When the negative voltage is applied, it is integrated to cause VCTL 142 to slowly ramp more negative, which in turn slowly increases the turnoff duty cycle of the main switch 17, smoothly dropping the power to the load. The applied negative voltage in conjunction with the input filter and integrator time constants results in an Enter Savings operating time period on the order of a minute. A positive voltage of about 0.45 volts is applied for Exit Savings. Prior to Exit Savings, VCTL 142 is at its Savings mode operating point, or sitting in the vicinity of −2V (varies with load type). When the positive voltage is applied, it is integrated to cause VCTL 142 to slowly ramp more positive, which in turn slowly decreases the turnoff duty cycle of the main switch 17, smoothly increasing the power to the load. The applied positive voltage in conjunction with the input filter and integrator time constants results in an Exit-Savings operating time period on the order of ½ minute. If the positive voltage were applied and the present invention were in Warm-Up mode (VCTL 142 already at zero volts), then the positive voltage would just hold VCTL 142 at zero volts in preparation for Enter Savings.

Low Voltage Power Supply Circuitry

Figure 8:
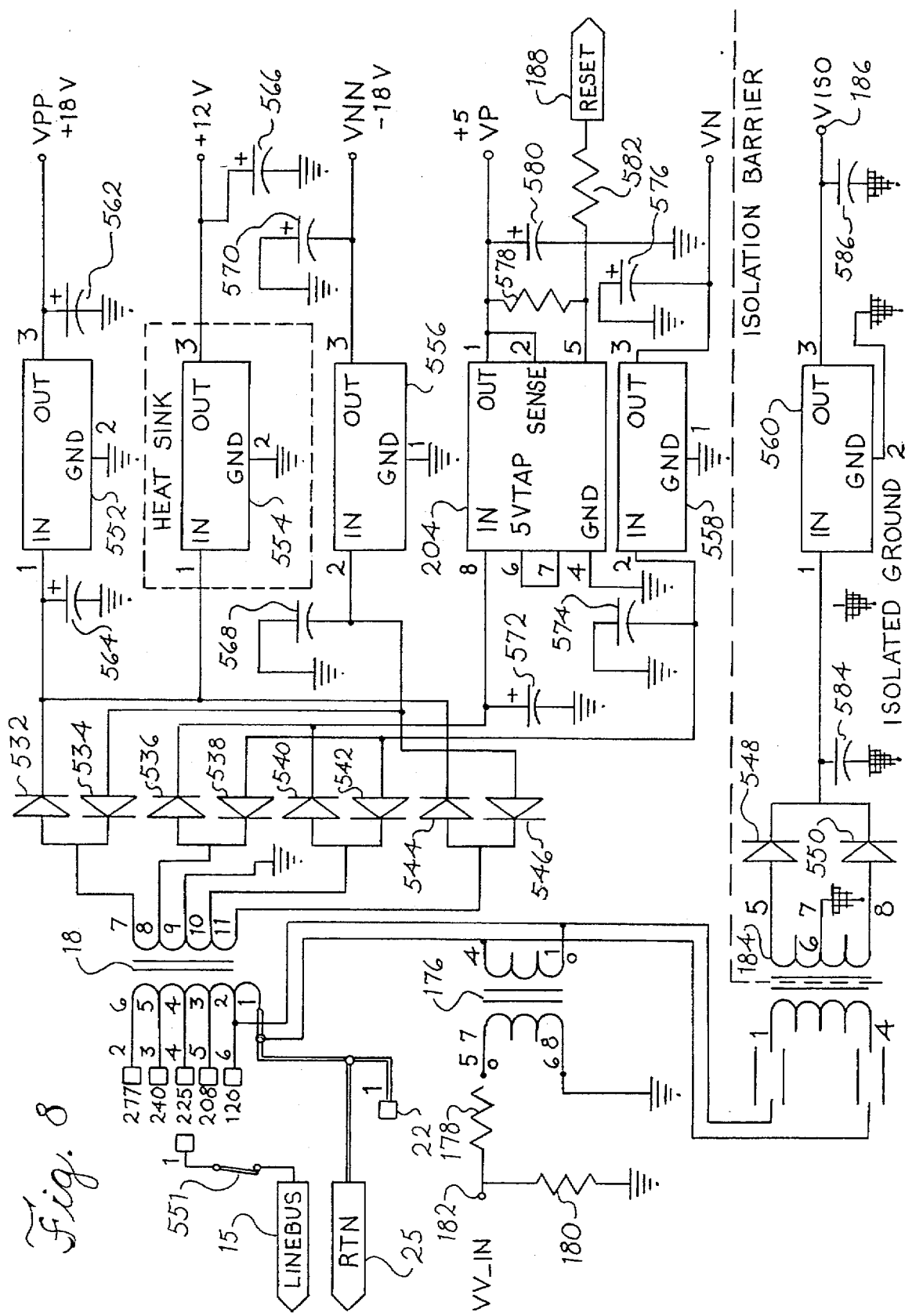
FIG. 8 is a schematic showing, in full or in part, embodiments of the following: a low voltage power supply, and a 5 volt voltage sense circuit, all in accord with the preferred power regulation circuit.

FIG. 8 shows a low voltage power supply circuit, well-known in the art, where transformer 18 is used to step down the AC line voltage to low voltages which are rectified, filtered, and regulated to generate the following voltages: ±15V (VPP, VNN), ±5V (VP, VN), and +12V power supplies.

The 120 Vac primary tap of transformer 18 is also used as a voltage sensor for relative power readings. Transformer 176 is used to efficiently step down the 120 Vac voltage to a range suitable for low voltage signal processing. Resistor 178 and resistor 180 are used to further scale the voltage to the desired level to create line voltage sense signal $VV_{13}$ IN 182. Transformer 184 is used as a step-down and isolation transformer for generation of the +5V isolated supply voltage VISO 186 for the remote status/communications interface circuit. Since the communications circuitry can be connected to systems external to the present invention, an isolation barrier in conformance with standardized safety requirements is maintained around this circuitry to separate it from higher-voltage circuits.

MONITOR CIRCUITS

Figure 11A:
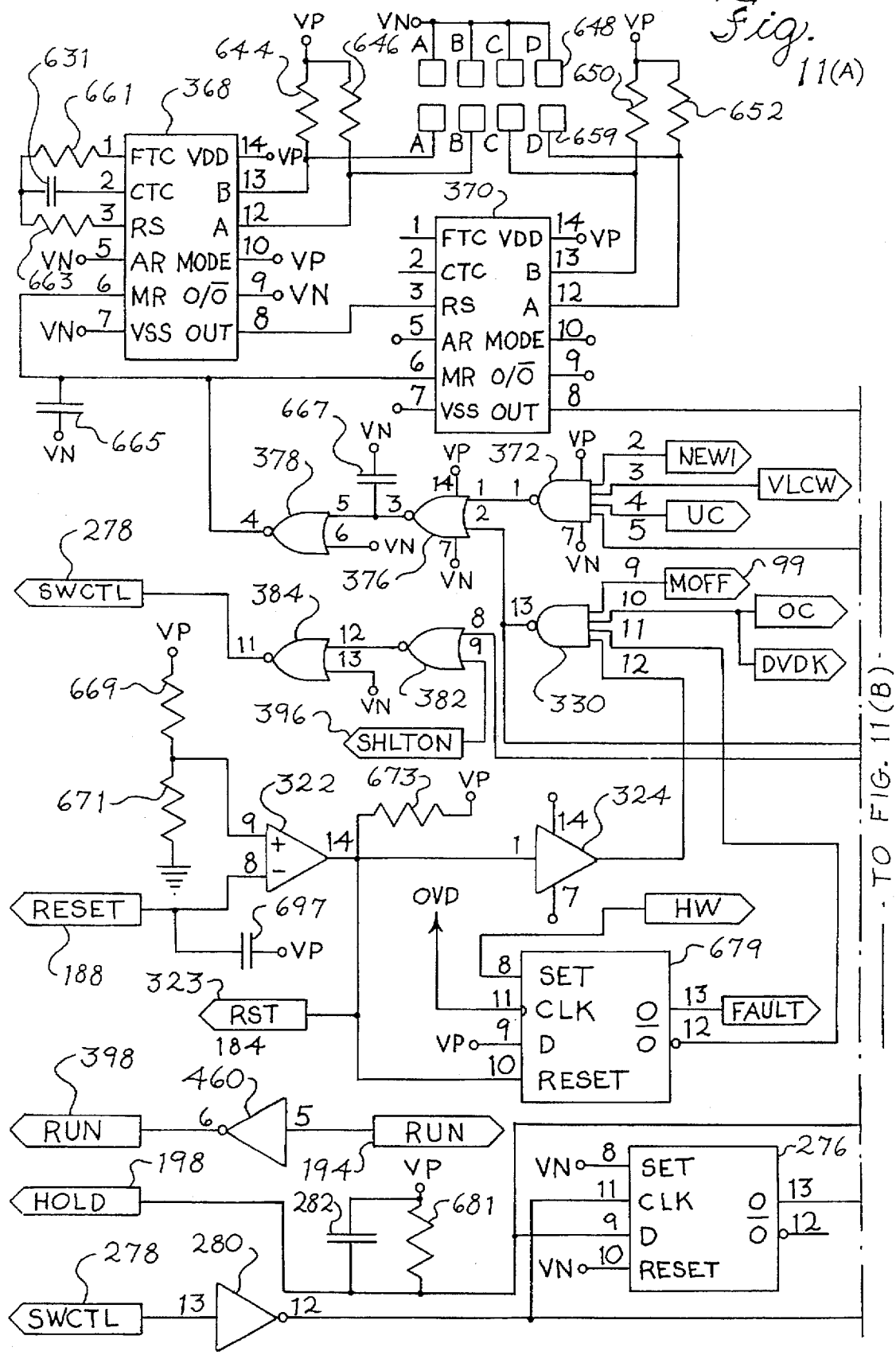
FIG. 11 is a schematic showing, in full or in part, embodiments of the following: a power monitor circuit, a current range detector circuit, a timer circuit, a manual off circuit, a warmup control logic circuit, and a capacitor bank selection circuit, all in accord with the preferred power regulation circuit.
Figure 11B:
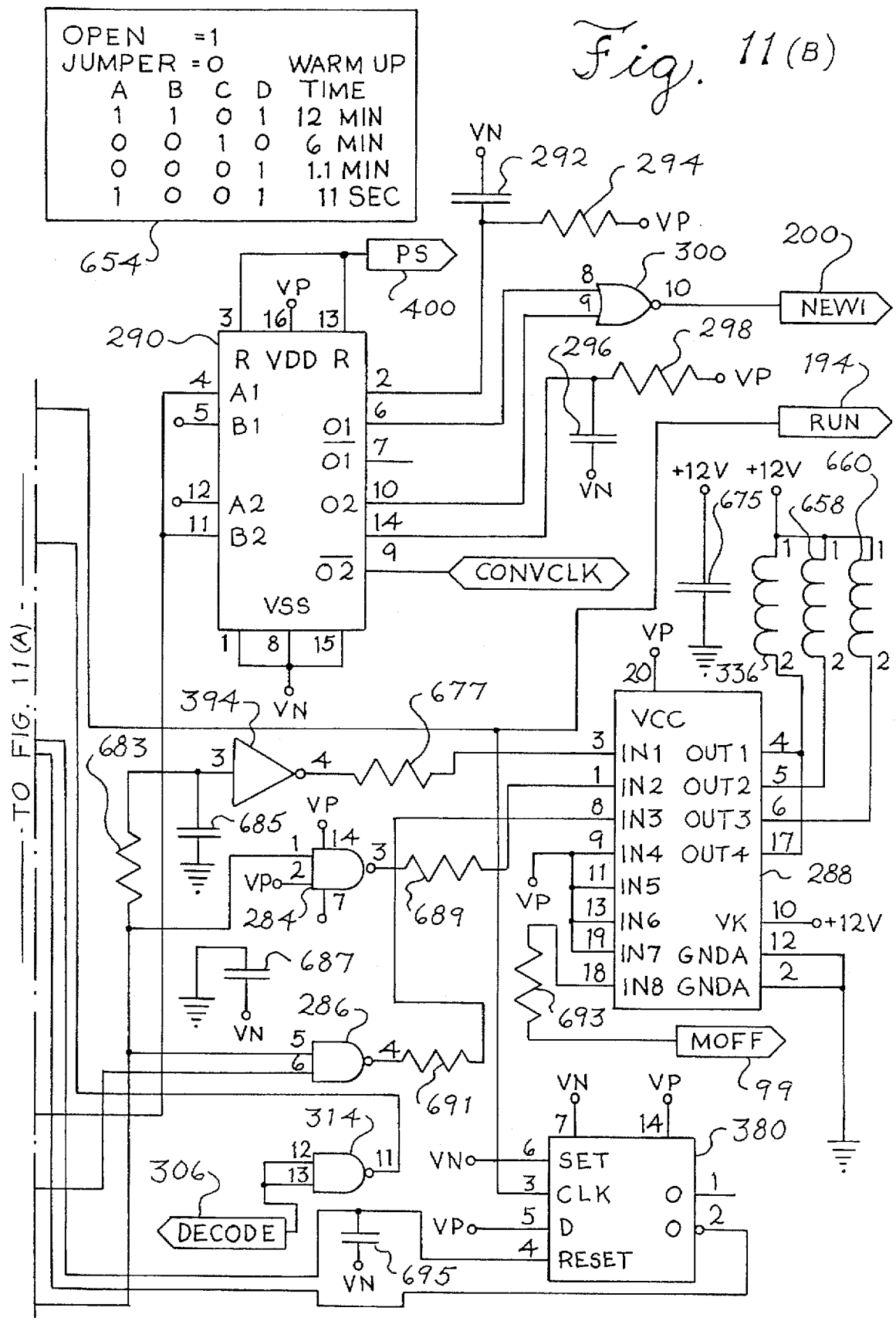
Figure 12:
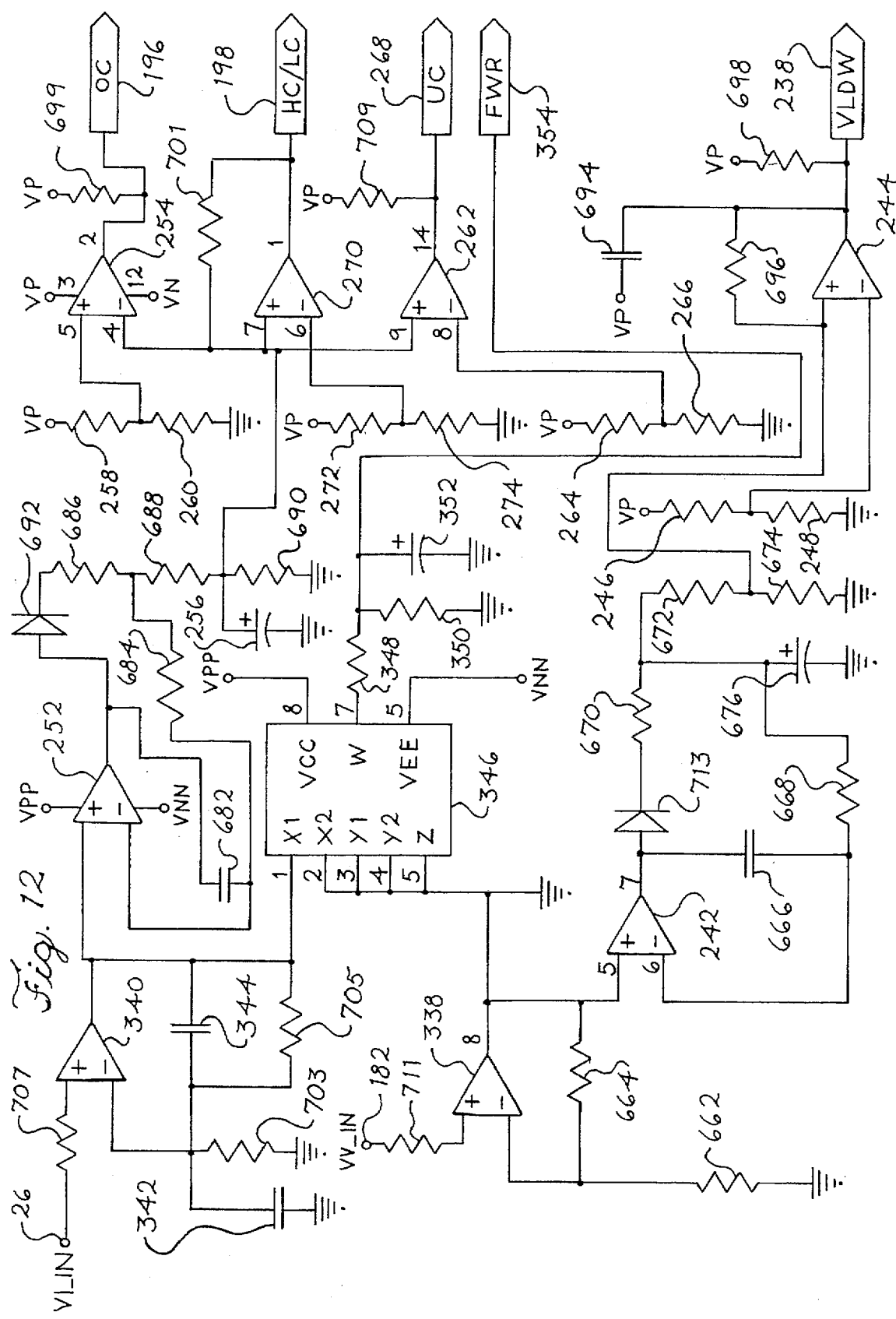
FIG. 12 is a schematic showing, in full or in part, embodiments of the following: an undervoltage detector circuit, an overcurrent detector circuit, an undercurrent detector circuit, a current range detector circuit and a power measurement circuit, all in accord with the preferred power regulation circuit.

Several circuits are employed to monitor operating and fault conditions. The conditions and related signal names are summarized below:

power-on and power-off (RESET* 188) (FIG. 8)

overvoltage (OVD 190) (FIG. 9)

half-wave (HW 192) (FIG. 7)

undervoltage (VLOW* 238) (FIG. 12)

overcurrent (OC* 196) (FIG. 12)

operating current range (HC/LC* 198, FIG. 12), and NEWI* 200 (FIG. 11)

long-term timer timeout (DECODE 306) (FIG. 9)

Power-On And Power-Off Detector Circuit

Referring to FIG. 8, a system initialization signal (RESET* 188) is generated by +5V regulator 204, or +12V monitor comparator 206 which is part of the 12 volt low voltage sense circuit 754 (see FIG. 9). This signal goes low if either the +5V output VP or +12V output is not within tolerance, which occurs when AC power is first applied to or removed from the present invention.

Overvoltage Detector Circuit

Referring to FIG. 7, when the main switch 17 and capacitor bank 70 are operating under timing control, a voltage is developed across the switch/capacitor bank 70 combination, or from AC line to load (Line-Load voltage). Normally this voltage is a well-defined quasi-sinusoidal waveform which has a peak voltage well below the breakdown rating of other related components. However, excessive peak voltages may be caused for non-normal operating conditions. To protect against such mis-application, the peak line-load voltage is scaled by resistor 208 and resistor 210 to create sense signal VSIG 212.

Referring to FIG. 9, comparator 318 compares VSIG 212 to a preset voltage determined by resistor 216 which represents a desired overvoltage trip point. If the peak line-load voltage exceeds the trip point, overvoltage signal OVD 190 switches low (−5V).

Half-Wave Fault Detector Circuit

Referring to FIG. 7, if either half of the main switch 17 should fail in an open condition (which is not likely since the normal failure mode is a short condition), the AC waveform delivered to the load changes from its normal fullwave shape to a halfwave shape. The halfwave waveform contains a DC component which may cause some loads to make a loud alarming humming noise or even eventually self-destruct. To protect against this failure mode, a halfwave detector circuit is provided which measures the average value of the waveform delivered to the load. The load voltage is sensed by resistor 218, resistor 220 and averaging capacitor 222. This is compared to the average line voltage as sensed by resistor 224, resistor 226, resistor 228 and averaging capacitor 230. Center resistor 226 is used to develop trip voltages above and below the average line voltage. These trip points are connected to comparator 232 and comparator 234, along with the sensed load voltage. If the average load voltage should go above the upper trip point or below the lower trip point, halfwave signal HW 192 (+5V) is generated. Filter capacitor 236 is used to filter out transient HW pulses which may occur during Enter Savings mode. During Warm-Up mode the average line and load voltages are too low and close together to ensure a valid comparison, so the HW 192 signal is inhibited (held low) by the RUN 194 signal which is low during Warm-Up.

Undervoltage Detector Circuit

Referring now to FIG. 12, the amplified voltage for $VV_{13}$ IN 182 from operational amplifier 338 is fed to comparator 242. The amplifier 338 has associated with it gain setting resistors 662 and 664. Comparator 242 scales the signal to obtain a DC representation of the average input AC line voltage. The scaled signal is rectified and filtered by diode 713 and capacitor 666. The representative voltage is held on capacitor 676. Operational amplifier 244 compares this voltage to a preset voltage determined by resistor 246 and resistor 248 which represents the desired undervoltage trip point. If the input voltage drops below the trip point, undervoltage signal VLOW* 238 switches low (−5V).

Overcurrent Detector Circuit

Still referring to FIG. 12, the amplified voltage for VI_IN 26 from operational amplifier 340 is fed to comparator 252. The amplifier 340 has associated with it gain setting resistors 703 and 705, and phase compensation circuitry in the form of capacitors 342 and 344 to compensate for phase shift caused by current transformer 16 (see FIG. 7). Comparator 252 scales the signal to obtain a DC representation of the average input AC line current. The scaled signal is rectified by diode 692 and filtered by capacitor 682. The representative voltage is held on capacitor 256. Comparator 254 compares the voltage on capacitor 256 to a preset voltage determined by resistor 258 and resistor 260, which represents a desired overcurrent trip point. If the input exceeds the trip point, overcurrent signal OC* 196 switches low (−5V).

Undercurrent Detector Circuit

Comparator 262 compares the voltage on capacitor 256 to a preset voltage determined by resistor 264 and resistor 266 which represents a desired undercurrent trip point. If the input current drops below the trip point, undercurrent signal UC *268 switches low (−5V).

Operating Range Detector Circuit

Comparator 270 compares the voltage on capacitor 256 to a preset voltage determined by resistor 272 and resistor 274 which represents the dividing point between high-range and low-range currents (approximately 13 amps for a 20-amp circuit). The resulting HC/LC* 198 signal is used to switch the appropriate capacitor bank, associated with relays 72 and 74, in parallel with the main switch 17.

Referring to FIG. 7, if the input current is lower than the trip point, the capacitor value associated with relay contact 72 is selected (HC/LC* —5V); if the input current is higher than the trip point, the capacitor value associated with relay 72 and relay 74 is selected (HC/LC* —+5V).

Referring to FIG. 11, the HC/LC* 198 signal is stored in latch 276 at the end of Warm-Up as signaled by the SWCTL 278 signal at the output of inverter 280 which inverts the SWCTL 278 signal. Capacitor 282 is used as a noise filter. The latch 276 output feeds logic gate 286 which is used with logic gate 284 and relay driver 288 to select the desired capacitance.

Whenever the AC input current changes sufficiently to cause the operating current range signal HC/LC* 198 to change state, dual one-shot 290 is triggered by the HC/LC* 198 signal. One input of the dual one-shot 290 is triggered by a low-to-high input transition, the other by a high-to-low transition. When triggered, the related one-shot section delivers an output pulse determined by an RC network consisting of capacitor 292 and resistor 294 or capacitor 296 and resistor 298. A pulse at either output of dual one shot 290 creates a NEWI* 200 negative pulse at the output of NOR gate 300.

Since the current may change during Enter Savings mode due to the desired power reduction, the HC/LC* 198 signal is inhibited unless in Savings mode by using the PS 400 (low) signal to inhibit dual one-shot 290.

Long Term Timer Circuit

Referring to FIG. 9, a long-term timer implemented with counter IC 304 is provided which automatically resets the present invention to Warm-Up mode approximately once every 20 hours. This timer is provided to ensure a full-power warmup period at least once a day for those cases where the present invention may be kept on continuously. The timer generates a DECODE 306 pulse approximately once every 20 hours. The pulse width is determined by resistor 308 and capacitor 310. Timer clocking is obtained from voltage sense signal $VV_{13}$ IN 182 as squared by comparator 108.

Referring to FIG. 11, the DECODE 306 signal is inverted by NOR gate 314 to obtain the proper polarity for reset purposes. The long-term timer is reset by the RST 323 signal via buffer/inverter 322.

Manual Off Circuit

Figure 13:
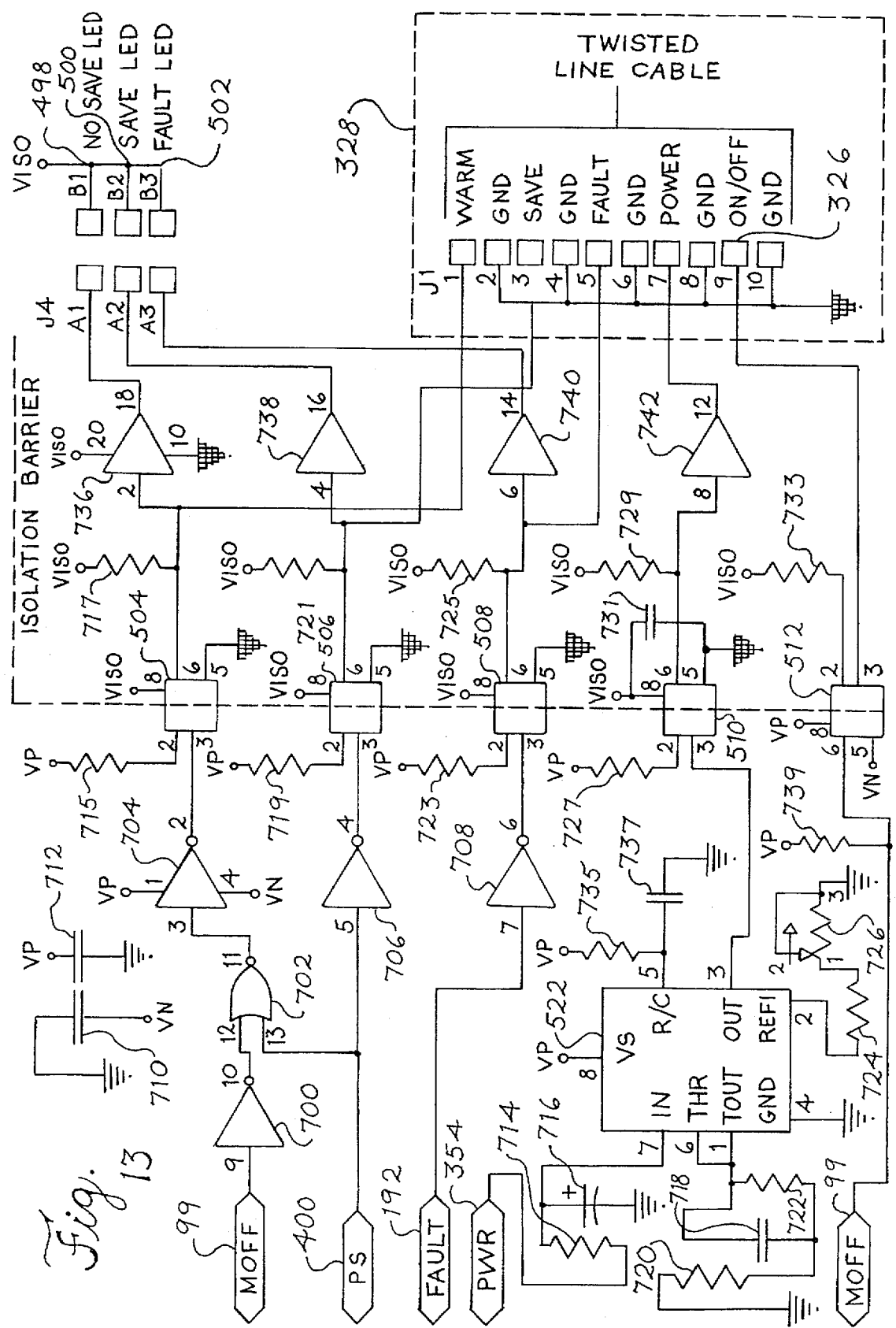
FIG. 13 is a schematic showing, in full or in part, embodiments of the following: a manual off circuit, an external interface circuit and system status circuits, all in accord with the preferred power regulation circuit.

Referring to FIG. 13, the MOFF* 99 signal is generated by an external input at the ON/OFF* 326 input at communications interface 328. When active (low), MOFF* 99 places the present invention in quick-reset Warm-Up mode via NAND gate 330 (see FIG. 11). However, MOFF* 99 also overrides two standard Warm-Up conditions and turns off the triac 82 (see FIG. 7) and main switch 17 (see FIG. 7). The former is accomplished by the MOFF* 99 input to relay driver 288 (see FIG. 11) which holds triac relay coil 336 on, which keeps the triac 82 off. The latter is accomplished by the MOFF* 99 input to the line-load voltage monitor circuit comparator 96 (see FIG. 7) which holds the main switch 17 off.

POWER AND PHASE MEASUREMENT CIRCUITS

Power Management Circuit

Referring to FIG. 12, the input AC line voltage and current sense signals $VV_{13}$ IN 182 and $VI_{13}$ IN 26 are buffered and amplified by operational amplifiers 338 and 340 respectively. Current sense amplifier 340 also includes filter capacitors 342 and 344 to compensate for the high-frequency roll-off characteristics of current transformer 16 (see FIG. 7). The amplified signals are fed to multiplier IC 346, which creates an output voltage representation proportional to the product of the instantaneous input AC line voltage and current. This signal, when filtered and scaled by resistor 348, resistor 350 and capacitor 352, is proportional to the input power (PWR) 354.

Phase Measurement Circuit

Referring to FIG. 9, the input AC line voltage and current sense signals $VI_{13}$ IN 26 and $VV_{13}$ IN 182 are buffered and squared by comparators 106 and 108 respectively, with the squared outputs crossing zero at essentially the same time that the actual AC line waveforms cross zero. These waveforms are fed to the phase comparator section of phaselock loop IC 358 (the other portions of the IC 358 are not used), which with filter resistor 360 and capacitor 362 generates a DC voltage (PH) 364 which is proportional to the phase difference between the AC line current and AC line voltage.

MODE CONTROL CIRCUITS

In an exemplary operation of the preferred embodiment of the present invention, the present invention's default state is the Warm-Up mode. In Warm-Up mode, power to the load is essentially the same as if the present invention were not present. The Warm-Up mode is initiated by activation of any of the monitor circuits described above. When all monitor circuit outputs are inactive, the Warm-Up mode begins a timeout period of approximately twelve (12) minutes, which allows the lighting load characteristics to stabilize. The connections on jumpers 648 and 659 (see FIG. 11) are used to set this time-out period. Warm-Up timer table 654 displays the necessary connections to set the time-out period.

Warmup Timer Circuit

Referring to FIG. 11, counter IC 368 and counter IC 370 are used to generate a nominal twelve (12) minute period which defines the length of the Warm-Up mode of operation. When the counter IC's are initialized at their MR (master rest) inputs, the output RUN 194 signal is reset low. After the twelve (12)-minute timeout, RUN 194 goes high and stays high until the counter is reset. RUN 194 is low for Warm-Up mode and Exit Savings mode; RUN 194 is high for Enter Savings and Savings mode.

Warmup Control Logic

The Warm-Up mode can be initiated by activating (setting low) any of the signals at the inputs of NAND gate 372 and NAND gate 330. These input signals are the outputs of the monitor circuits described above. When any input goes low, the logical operation of NAND gate 372 and NAND gate 330 and NOR gate 376 and NOR gate 378 generates the MR signal for counter IC 368 and counter IC 370. When Warm-Up occurs, the main switch 17 (see FIG. 7) is switched from duty-cycle control to full-on. There are two means for accomplishing this: soft reset and quick reset. A controlled soft reset (Exit Savings mode) is activated by the upper NAND gate inputs (NEWI*, VLOW*, UC* and DECODE). The upper NAND gate 372 only resets the warmup timer which in turn switches the RUN 194 signal low. This causes the present invention to slowly increase its on-time duty cycle (over approximately a 30 second period) until the main switch 17 (see FIG. 7) is fully on. This is done so that the system will return to full power slowly so that variations in light intensity for lamp loads will not be noticeable to observers. A quick return to full power may result in a slight but noticeable "blink" in brightness increase.

A quick reset is activated by lower NAND gate 330 inputs for fault or system power change conditions (i.e., MOFF*, OC*, OVD*, FAULT* and RST*). In addition to resetting the warmup timer, the NAND gate 330 also generates the SWCTL 278 signal via latch 380 and NOR gate 382 and NOR gate 384. SWCTL 278 is used to restore the present invention to its Warm-Up state where the main switch 17 is full on, the triac 82 is on, and the capacitor bank 70 is off. SWCTL 278 drives analog switch 386 (see FIG. 10), which turns off local oscillator (LOSC) 132 by clamping it to VN 390. This ensures full turn-on of the main switch 17. SWCTL 278 also turns off the capacitor bank 70 and turns on the triac 82 (see FIG. 7) via inverter 280, inverter 394, logic gate 284, logic gate 286 and relay driver 288 (see FIG. 11). SWCTL 278 is also generated at the end of the soft reset (Exit Savings) period by the SHUTDN 396 signal into NOR gate 382 which is generated when the duty cycle has returned to minimum.

Enter Savings Mode

When the Warm-Up period is over and RUN 194 has been activated, the Enter Savings mode is activated by the RUN 194 and RUN* 398 signals (see FIG. 11) and the power save signals (PS 400 and PS* 402) which are generated by latch 404 (see FIG. 10). Latch 404 is reset by RUN* 398 during Warm-Up so that PS 400 is initially low and PS* 402 is initially high. Capacitor 412 is used as a noise filter to prevent false resets.

At the end of Warm-Up when RUN* 398 goes low and PS 400 is low, the RUN* 398/PS 400 combination at the input to NOR gate 418 activates analog gate 420, while other logic combinations deactivate analog gate 422 and analog gate 424. When analog gate 420 is activated, it connects the resistor bias network consisting of resistor 426 and resistor 428 to buffer amplifier 430. The negative bias voltage is used to create a slow negative-going ramp voltage at VCTL 142 for smooth entry into the power savings mode.

Load power is sensed by the power measurement circuit as represented by voltage signal PWR 354. This signal is applied to capacitor 434 during Warm-Up, and is trapped on capacitor 434 at the end of Warm-Up by analog gate 436 when RUN* 398 goes low. Capacitor 434 is selected to be of a quality and value such that its leakage and the leakages of analog gate 436 and buffer amplifier 438 will not cause an appreciable change in the stored voltage during the relatively brief Enter Savings period.

The stored voltage on capacitor 434 is buffered by unity-gain buffer amplifier 438 and applied through calibration and scaling resistors 440, 442 and 444 to the plus input of comparator 446. These resistors set the ratio of PWR 354 to the desired target value for power savings. The ratio can vary depending on the application and can be adjusted by resistor 440. The PWR 354 signal is directly applied to the negative input of comparator 446. Noise filter capacitor 448 is connected across the inputs of comparator 446. The direct PWR 354 input is higher than the scaled target value so that the output of comparator 446 is initially low.

During Enter Savings, VCTL 142 reduces the output power which causes the PWR 354 signal to decrease. When PWR 354 equals the target value (i.e., when the reduced operating power equals the target power), the output of comparator 446 switches high, which clocks latch 404 and forces PS 400 high and PS* 402 low. Capacitor 450 is used as a noise filter to prevent false switching. At this point, PS 400 in conjunction with clock pulse CONVCLK 452 and timing/logic elements resistor 454, capacitor 456, inverter 458, NAND gate 459, inverter 462, diode 464, analog gate 466 and a pullup/filter consisting of resistor 468 and capacitor 470 generates a clock pulse for A/D-D/A IC 472 (see FIG. 10). When clocked, IC 472 samples the voltage representation of the input phase angle PH 364 at the point when the target power was reached and stores the analog value as a digital value. The digital value is converted internally by IC 472 to analog output voltage PHREF (phase reference) 476 which is essentially the same value as the value of PH 364 at the sample point; i.e., IC 472 has captured the value of PH 364 at the target power point and permanently stored it as PHREF 476 (until reset by power-off or another sample pulse).

Maintain Savings Mode

When PS* 402 goes low, the RUN* 398/PS* 402 combination at the input to NOR gate 482 activates analog gate 422, while other logic combinations deactivate analog gate 420 and analog gate 424. When analog gate 422 is activated, it connects stored phase voltage PHREF 476 to buffer amplifier 430. At this time a high PS 400 signal activates analog gate 486 which connects the phase signal PH 364 to unity-gain inverting amplifier 490 to create the feedback signal input to resistor 172.

The phase reference voltage PHREF 476 is compared by the ramp and feedback amplifier to the actual phase voltage PH 364 to maintain operating power at the target power savings point. It has been determined, over a wide range of loads, that input phase angle shifts positive by approximately 40° when power is reduced from full power to a target power value representing a 25% power savings. This determination makes input phase angle a good representation of the desired power savings ratio (ratio of target power to initial full power) even in the presence of some subsequent change in the operating power such as lamp outages or downline switching. During SAVINGS, the input phase angle at the target power level as represented by PHREF 476 is compared with subsequent values representative of phase angle (PH 364). If a subsequent value representative of input phase angle during SAVINGS is not equal to PHREF 476, or the difference between PHREF 476 and the subsequent value exceeds a predetermined threshold, the switch 17 duty cycle is adjusted to make the values normally equal. This adjustment ensures that the 25% power savings level is maintained.

Exit Savings Mode Control

Exit Savings occurs if while in Savings mode, one of the soft-reset monitor circuits (inputs to NAND gate 372, see FIG. 11) is activated:

overvoltage (OVD*)

undervoltage (VLOW*)

undercurrent (UC*)

operating current range change (NEWI*)

long-term timer timeout (DECODE)

Exit Savings is an approximately ½ minute operating period where a control loop ramps the output power from target power to full power.

Referring to FIG. 10, VCTL 142 is below zero volts in Savings mode which sets signal SHUTDN 396 low via comparator 494. SHUTDN 396 will go high when VCTL 142 reaches approximately −0.1 volt, as VCTL 142 returns to zero volts during Exit Savings, capacitor 496 provides additional delay and noise filtering. Referring to FIG. 11, SHUTDN 396 is applied to NOR gate 382, which activates the SWCTL 278 signal at the output of NOR gate 384. As described above, SWCTL 278 is used to turn off LOSC 132 after it is guaranteed by SHUTDN 396 that the off-time duty cycle has returned to its minimum value by virtue of VCTL 142 (see FIG. 7) returning to zero volts. This turns the main switch 17 fully on. SWCTL 278 also turns off the capacitor bank 70 and turns on the triac 82.

EXTERNAL INTERFACE AND STATUS CIRCUITS

FIG. 13 depicts a communications interface 328 that allows the status of the power control system to be monitored externally, and also allows the control system 2 to be turned on or off. The communications circuitry 328 also drives three LED front-panel status indicators: No Savings 498 (Warm-Up mode), Savings 500 (Savings mode), and Fault 502 (halfwave fault). Optoisolators 504, 506, 508, 510 and 512 are used to isolate the high-voltage internal circuitry from external equipment.

An external on/off signal can be applied to communications interface 328 to generate the MOFF* 99 signal which commands the control system 2 to turn off (on =J1-9 open, off =J1-9 connected to J1-10). The internal status signals MOFF* 99, Power Savings Mode (PS 400), halfwave fault condition (HW 192), and operating power (PWR 354) are fed to the optoisolator circuits and related buffers to allow monitoring by external equipment via communications interface 328 and to drive the front-panel status LEDs. The PWR 354 signal is a DC voltage proportional to input power.

PWR 354 feeds voltage-to-frequency converter IC 522 which allows efficient transmission of an analog signal over the optoisolator interface. A frequency measurement on the external side with appropriate conversion factor can be used to measure the present invention's operating power.

FIGS. 7–13 include a number of other components (e.g. resistors, capacitors, diodes) that are used in ways that would be understood by those skilled in the art (e.g., biasing, filtering, etc.).

The following is a listing of components and related values used in the circuitry shown in FIGS. 7–13.

Component List

Inductor 14, 10 µH
Resistor 20, 49.9K
IC driver 36, UC 3705T
Resistor 38, 18.2 k
Resistor 40, 18.2 k
Resistor 50, 20 k
Resistor 52, 10 k
Capacitor 54, 10 µF, 35V
Capacitor 56, 10 µF, 35V
Resistor 76, 330 k, ½ W
Resistor 78, 330 k, ½ W
Resistor 84, 100 k, ½ W
Snubber Capacitor 85, 0.1 µF to 1 µF
Optocoupler 88, PS2606
Resistor 90, 22 k, 3 W
Resistor 92, 6.81 k
Resistor 94, 150 k
Capacitor 98, 0.01 µF
Capacitor 100, 10 µF, 35V
Diode 102, 1N914
Resistor 104, 20K
Comparator 106, LM339
Comparator 108, LM339
IC 112, 4538
Capacitor 114, 0.01 µF
Resistor 116, 20 k
Capacitor 118, 0.01 µF
Resistor 120, 20 k
Transistor 122, 2N2222A
Transistor 124, 2N2222A
Resistor 126, 4.75 k
Resistor 127, 4.75 k
Capacitor 128, 0.15 µF
Transistor 130, 2N2907A
Calibration Potentiometer 134, 5 k
Diode 136, 1N914
Comparator 140, LM339
Dual one shot 144, 4538
Resistor 146, 100 k
Capacitor 148, 0.01 µF
Diode 150, 1N5817
Three Terminal Regulator 156, LP2950CZ-5
Operational Amplifier 158, LM324
Resistor 160, 20 k
Capacitor 162, 100 µF, 25V
Capacitor 164, 0.1 µF
Blocking Diode 166, 1N914
Resistor 168, 10 k
Resistor 170, 100 k
Resistor 172, 100 k
Regulator 204, LP2951
Monitor Comparator 206, LM339
Resistor 208, 330 k
Resistor 210, 2 k Resistor 214, 10 k
Resistor 216, 2.37 k
Resistor 218, 330 k
Resistor 220, 619 k
Capacitor 222, 100 μF, 25V
Resistor 224, 330 k, ½ W
Resistor 226, 8.06 k
Resistor 228, 2.37 k
Capacitor 230, 100 μF, 25V
Comparator 232, LM339
Comparator 234, LM339
Capacitor 236, 100 μF, 25V
Operational Amplifier 242, LM324
Operational Amplifier 244, LM339
Resistor 246, 75 k
Resistor 248, 68.1 k
Comparator 252, LM324
Comparator 254, LM339
Capacitor 256, 100 μF, 25V
Resistor 258, 37.4 k
Resistor 260, 49.9 k
Comparator 262, LM339
Resistor 264, 49.9 k
Resistor 266, 10 k
Comparator 270, LM339
Resistor 272, 47.5 k
Resistor 274, 18.7 k
Latch 276, 4013
Inverter 280, 4106
Capacitor 282, 0.01 μF
Logic Gate 284, 4011
Logic Gate 286, 4011
Relay Driver 288, UDN 2596A
Dual One-Shot 290, 4538
Capacitor 292, 0.01 μF
Resistor 294, 20 k
Capacitor 296, 0.01 μF
Resistor 298, 20 k
NOR gate 300, 4001
Counter IC 304, MC14536B
Resistor 308, 100 k
Capacitor 310, 0.001 μF
Comparator 318, LM339
Buffer/Invertor 322, LM339
Inverter 324, 4106
NAND Gate 330, 4012
Op Amp 338, LM324
Op Amp 340, LM324
Filter Capacitor 342, 0.033 μF
Filter Capacitor 344, 68pF
Multiplier 346, AD633
Resistor 348, 20 k
Resistor 350, 20 k
Capacitor 352, 10 μF, 25V
Phaselock loop 358, 4046
Resistor 360, 2 k
Capacitor 362, 100 μF, 35V
Counter IC 368, 4571
Counter IC 370, 4571
Latch 380, 4013
NOR Gate 382, 4001
NOR Gate 384, 4001
Analog Switch 386, 4056
Inverter 394, 4106
Capacitor 412, 0.01 μF
NOR Gate 418, 4001
Analog Gate 420, 4066
Analog Gate 422, 4066
Analog Gate 424, 4066
Resistor 426, 100 k
Resistor 428, 4.75 k
Buffer Amplifier 430, LM324
Capacitor 434, 100 μF, 25V
Analog Gate 436, 4066
Buffer Amplifier 438, LM324
Resistor 440, 10 k
Resistor 442, 15 k
Resistor 444, 47.5 k
Comparator 446, LM339
Capacitor 448, 0.01 μF
Capacitor 450, 0.001 μF
Resistor 454, 332 k
Capacitor 456, 62pF
Inverter 458, 4106
NAND gate 459, 4011
Inverter 460, 4106
Inverter 462, 4106
Diode 464, 1N914
Analog Gate 466, 4066
Resistor 468, 10 k
Capacitor 470, 0.001 μF
A/D-D/A IC 472, AD7569
NOR Gate 482, 4001
Analog Gate 486, 4066
Amplifier 490, LM324
Comparator 494, LM339
Capacitor 496, 10 μF, 35V
Optoisolators 504, 6N136
Optoisolators 506, 6N136
Optoisolators 508, 6N136
Optoisolators 510, 6N136
Optoisolators 512, 6N136
IC 522, LM331
Resistor 525, 49.9 k
OR'ing Diode 526, 1N914
Resistor 527, 49.9 k
OR'ing Diode 528, 1N914
Resistor 529, 4 k
OR'ing Diode 530, 1N914
Resistor 531, 1 k
Diode 532, 1N4003
Resistor 533, 10M
Diode 534, 1N4003
Resistor 535, 10 k
Diode 536, 1N4003
Resistor 537, 10M
Diode 538, 1N4003
Resistor 539, 10 k
Diode 540, 1N4003
Resistor 541, 1M
Diode 542, 1N4003
Diode 544, 1N4003
Diode 546, 1N4003
Capacitor 547, 1 μF, 15V
Diode 548, 1N4003
Diode 550, 1N4003
Diode 552, LM7815
Diode 554, LM7812
Diode 556, LM7915
Diode 558, LM7905
Diode 560, LM7805
Capacitor 562, 10 μF,35V
Capacitor 564, 2200 μF, 50V
Capacitor 566, 10 μF, 35V Capacitor 568, 330 µF, 50V
Capacitor 570, 10 µF, 35V
Capacitor 572, 330 µF, 25V
Capacitor 574, 330 µF, 25V
Capacitor 576, 10 µF, 35V
Resistor 578, 332 k
Resistor 579, 100 k
Capacitor 580, 10 µF, 35V
Resistor 581, 10 k
Resistor 582, 332 k
Resistor 583, 2.37 k
Capacitor 584, 470 µF, 25V
Capacitor 586, 10 µF, 35V
Resistor 588, 10 k
Resistor 590, 10M
Capacitor 592, 0.01 µF
Resistor 594, 10 k
Resistor 596, 4.75 k
Resistor 598, 10 k
Resistor 600, 10 k
Capacitor 602, 0.01 µF
Resistor 604, 10M
Resistor 606, 4.75 k
Resistor 608, 100 k
Resistor 610, 37.4 k
Resistor 612, 49.9 k
Resistor 614, 49.9 k
Resistor 622, 10 k
Resistor 624, 16.2 k
Resistor 626, 10 k
Resistor 628, 10 k
Capacitor 631, 0.001 µF
Resistor 634, 100 k
Resistor 636, 10 k
Resistor 637, 4.75 k
Resistor 638, 6.19 k
Capacitor 639, 68pF
Capacitor 640, 0.1 µF
Capacitor 641, 0.1 µF
Resistor 642, 10 k
Resistor 643, 10M
Resistor 644, 100 k
Resistor 645, 100 k
Resistor 646, 100 k
Resistor 647, 100 k
Resistor 649, 2 k
Resistor 650, 100 k
Resistor 651, 100 k
Resistor 652, 100 k
Resistor 653, 49.9 k
Resistor 655, 100 k
Resistor 657, 100 k
Resistor 661, 37.4 k
Resistor 662, 11.8 k
Resistor 663, 75 k
Resistor 664, 71.5 k
Capacitor 665, 0.0033 µF
Capacitor 666, 33pF
Capacitor 667, 0.0033 µF
Resistor 668, 49.9 k
Resistor 669, 100 k
Resistor 670, 100 k
Resistor 671, 100 k
Resistor 672, 75 k
Resistor 673, 4.75 k
Resistor 674, 20 k
Capacitor 675, 0.1 µF
Capacitor 676, 100 µF, 25V
Resistor 677, 100 k
Latch 679, 4013
Resistor 681, 4.75 k
Capacitor 682, 33pF
Resistor 683, 432 k
Resistor 684, 49.9 k
Capacitor 685, 0.1 µF
Resistor 686, 100
Capacitor 687, 0.1 µF
Resistor 688, 22.1 k
Resistor 689, 100 k
Resistor 690, 20 k
Resistor 691, 100 k
Resistor 690, 20 k
Diode 692, 1N914
Resistor 693, 100 k
Capacitor 694, 0.1 µF
Capacitor 695, 0.01 µF
Resistor 696, 2M
Capacitor 697, 0.01 µF
Resistor 698, 4.75 k
Resistor 699, 4.75 k
Inverter 700, 4049
Resistor 701, 2M
NOR gate 702, 4001
Resistor 703, 11.8 k
Inverter 704, 4049
Resistor 705, 71.5 k
Inverter 706, 4049
Resistor 707, 10 k
Inverter 708, 4049
Resistor 709, 4.75 k
Capacitor 710, 0.1 µF
Resistor 711, 10 k
Capacitor 712, 1 µF
Diode 713, LN914
Resistor 714, 100 k
Resistor 715, 1 k
Capacitor 716, 10 µF, 35V
Resistor 717, 10 k
Capacitor 718, 1 µF
Resistor 719, 1 k
Resistor 720, 49.9 k
Resistor 721, 10 k
Resistor 722, 100 k
Resistor 723, 1 k
Resistor 724, 11.8 k
Resistor 725, 10 k
Potentiometer 726, 5 k
Resistor 727, 1 k
NAND gate 728, 4049
Resistor 729, 10 k
NAND gate 730, 4049
Capacitor 731, 0.1 µF
Resistor 733, 475
Resistor 735, 6.81 k
Buffer 736, MC74AC241
Capacitor 737, 0.01 µF
Buffer 738, MC74AC241
Resistor 739, 10 k
Buffer 740, MC74AC241
Buffer 742, MC74AC241
Transistor 744, MPQ2222A
Transistor 746, MPQ2222A
Resistor 748, 12.1 k
Resistor 750, 10 k Additional advantages and modifications will readily occur to those skilled in the art. The invention, in its broader aspects, is therefore not limited to the specific details, representative apparatus, and illustrative examples shown and described. Various modifications and variations can be made to the present invention without varying from the scope or spirit of the invention, and it is intended that the present invention cover the modifications and variations provided they come within the scope of the appended claims and their equivalents.

What is claimed is:

1. An AC power regulation system for controlling load power to a load, said power regulation system having an input for coupling to an AC power source and having an output for coupling to the load, said power regulation system comprising:

a controllable switch coupled in series between the input and the output;

a capacitor circuit for supplying capacitance coupled in parallel with the controllable switch;

circuitry for turning-on the controllable switch to a conducting state;

circuitry for turning-off the controllable switch to a non-conducting state;

circuitry for setting and storing a target power value, wherein each of said circuitry for turning on and said circuitry for turning off said controllable switch operate in conjunction to reduce power supplied to said load to said target power value;

circuitry for measuring a value representative of a phase angle of said load after said target power value is achieved;

circuitry for storing a value representative of a phase angle; and circuitry for monitoring subsequent values representative of load phase angles and comparing them with said stored value representative of a phase angle to maintain a desired power savings with respect to said load.

2. The system of claim 1 further comprising circuitry for generating power sense signals responsive to said load power.

3. The system of claim 2 further comprising switch control circuitry for generating control signals to control said circuitry for turning-on said controllable switch to said conducting state at a selected turn-on time and said circuitry for turning-off said controllable switch to said non-conducting state at a selected turn-off time prior to a line current zero-crossing point, said turn-off time being selected by said switch control circuitry in response to said power sense signals.

4. The system of claim 3 wherein said switch control circuitry for generating control signals further comprises circuitry for detecting a voltage across the controllable switch and for generating a differential signal in response thereto, such that said selected turn-on time is responsive to said differential signal being below a predetermined threshold.

5. The system of claim 3 wherein the ratio of said turn-on time to said turn-off time is adjusted when the difference between at least one of said subsequent values representative of load phase angle and said stored value representative of a phase angle exceeds a predetermined threshold.

6. An AC power regulation system for controlling load power to a load, said power regulation system having an input for coupling to an AC power source and having an output for coupling to the load, said power regulation system comprising:

a controllable switch coupled in series between the input and the output;

circuitry for supplying capacitance coupled in parallel with the controllable switch;

circuitry for generating power sense signals responsive to the load power;

circuitry for turning-on the controllable switch to a conducting state;

circuitry for turning-off the controllable switch to a non-conducting state;

switch control circuitry for generating control signals to control said circuitry for turning-on and said circuitry for turning-off such that the controllable switch is turned on to a conducting state at a selected turn-on time, and is turned off to a non-conducting state at a selected turn-off time prior to a line current zero-crossing point, said turn-off time being selected by said switch control circuitry in response to said power sense signals; and circuitry for ensuring that said turn-off time initially occurs just in advance of a line current zero-crossing point.

7. The system of claim 6 wherein said circuitry for ensuring that said turn-off time initially occurs just in advance of a line current zero-crossing point, switches said controllable switch off to a non-conducting state at a predetermined time period in advance of a line voltage zero-crossing point.

8. The system of claim 7 wherein said predetermined time period is 1.8 milliseconds in advance of said line voltage zero-crossing point.

9. A method of AC power regulation for controlling power to a load in an electrical system, said system having an input for coupling to an AC power source, an output for coupling to the load, and a controllable switch coupled in series between said input and said output, comprising the steps of:

operating said controllable switch during a first mode of operation such that substantially full-power is supplied to said load;

initiating a power reduction mode after said first mode, wherein power supplied to said load is gradually reduced during said power reduction mode from said substantially full power to a target value over a period of time;

thereafter initiating a power-saving mode, wherein the power supplied to said load substantially corresponds to said target value;

measuring a value representative of a phase angle of said load after said target value is achieved;

storing said value representative of a phase angle of said load; and thereafter monitoring subsequent values representative of load phase angles and comparing them with said stored value representative of a phase angle to maintain a desired power savings with respect to said load.

10. The method of claim 9 wherein said target value is derived at least in part based on a selected percentage of the average power supplied to said load during said first mode of operation.

11. The method of claim 9 further comprising the steps of:

causing said system to adjust the power to said load when the difference between said stored value representative of a phase angle and said monitored value representative of a phase angle exceeds a predetermined threshold.

12. The method of claim 9 further comprising the steps of providing a capacitor circuit in parallel with said controllable switch, and selecting a capacitance for said capacitor circuit based at least in part on said substantially full power current supplied to said load.

13. The method of claim 9 wherein said target value is derived after a pre-selected operating time period.

14. A method of AC power regulation for controlling power to a load in an electrical system, said power regulation system having an input for coupling to an AC power source and an output for coupling to the load, and having a controllable switch coupled in series between said input and said output, comprising the steps of:

operating said controllable switch during a first mode of operation such that substantially full-power is supplied to said load;

initiating a power reduction mode after said first mode, wherein power supplied to said load is gradually reduced during said power reduction mode from said substantially full power to a target value over a period of time;

gradually easing into said power reduction mode by initially turning off said controllable switch just in advance of a load current zero-crossing point; and causing the switch at all times to be in an off condition prior to the next-successive load current zero-crossing and causing the switch to be in an on condition following said next-successive load current-zero crossing.

15. A method of AC power regulation for controlling power to a load in an electrical system, said system having an input for coupling to the load and a controllable switch coupled in series between said input and said output, comprising the steps of:

operating said controllable switch such that substantially full-power is supplied to said load;

gradually reducing said power supplied to said load from said substantially full power to a target value over a period of time;

measuring a value representative of a phase angle of said load after said target value is achieved;

storing said value representative of a phase angle of said load; and thereafter monitoring subsequent values representative of load phase angles and comparing them with said stored value representative of a phase angle to maintain a desired power savings with respect to said load.

16. A method of AC power regulation for controlling power to a load in an electrical system, said power regulation system having an input for coupling to an AC power source and having an output for coupling to the load, and having a controllable switch coupled in series between said input and said output, comprising the steps of:

operating said controllable switch such that substantially full-power is supplied to said load;

reducing said power supplied to said load from said substantially full power to a target value over a period of time;

gradually reducing said power supplied to said load by initially turning off said controllable switch just in advance of a load current zero-crossing point; and causing the switch at all times to be in an off condition prior to the next-successive load current zero-crossing point and causing the switch to be in an on condition following said next-successive load current zero-crossing point.

* * * * *

UNITED STATES PATENT AND TRADEMARK OFFICE
CERTIFICATE OF CORRECTION

PATENT NO.    : 5,754,036
DATED         : May 19, 1998
INVENTOR(S)   : N. Edward Walker It is certified that error appears in the above-identified patent and that said Letters Patent is hereby corrected as shown below:

On the Title Page

Page 2, column 2, [56] after line 5, please insert:

--4,733,138     3/1988     Perlman et al.     315/307--.

Signed and Sealed this

Third Day of July, 2001

Attest:

NICHOLAS P. GODICI
*Attesting Officer*   *Acting Director of the United States Patent and Trademark Office*